(12) United States Patent
Masuda

(10) Patent No.: US 12,062,110 B2
(45) Date of Patent: Aug. 13, 2024

(54) IMAGE PROCESSING APPARATUS AND IMAGE PROCESSING METHOD

(71) Applicant: SONY CORPORATION, Tokyo (JP)

(72) Inventor: Tooru Masuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 659 days.

(21) Appl. No.: 17/250,647

(22) PCT Filed: Aug. 16, 2019

(86) PCT No.: PCT/JP2019/032180
§ 371 (c)(1),
(2) Date: Feb. 16, 2021

(87) PCT Pub. No.: WO2020/040061
PCT Pub. Date: Feb. 27, 2020

(65) Prior Publication Data
US 2021/0192680 A1    Jun. 24, 2021

(30) Foreign Application Priority Data
Aug. 24, 2018   (JP) .................................. 2018-157652

(51) Int. Cl.
*G06N 20/00*     (2019.01)
*G06F 18/214*    (2023.01)
(Continued)

(52) U.S. Cl.
CPC .............. *G06T 1/20* (2013.01); *G06F 18/214* (2023.01); *G06N 20/00* (2019.01); *G06T 3/12* (2024.01);
(Continued)

(58) Field of Classification Search
CPC ........................................................ G06T 1/20
See application file for complete search history.

(56) References Cited

U.S. PATENT DOCUMENTS

2017/0287194 A1*  10/2017  Katz ..................... H04N 5/33
2018/0101989 A1*   4/2018  Frueh .................. G06T 19/20
(Continued)

FOREIGN PATENT DOCUMENTS

| CN | 102473280 A | 5/2012 |
|----|-------------|--------|
| CN | 104463786 A | 3/2015 |

(Continued)

OTHER PUBLICATIONS

Liu, et al., "Image Inpainting for Irregular Holes Using Partial Convolutions", Computer Vision and Pattern Recognition (cs.CV), Dec. 15, 2018, 23 pages.

(Continued)

*Primary Examiner* — Oneal R Mistry
(74) *Attorney, Agent, or Firm* — CHIP LAW GROUP

(57) ABSTRACT

An image processing apparatus (100) according to the present disclosure includes: a learning-data creation unit (132) configured to perform projection transformation on image data including a target as a subject, the learning-data creation unit (132) being configured to create learning data including the target as correct data; and a model generation unit (133) configured to generate, based on the learning data created by the learning-data creation unit (132), a learned model for detecting the target included in input data that includes a wide angle view image and is input to the learned model, the wide angle view image being created by projection transformation identical in scheme to the projection transformation by which the learning data is created.

20 Claims, 15 Drawing Sheets

(51) Int. Cl.
*G06T 1/20* (2006.01)
*G06T 3/12* (2024.01)
*G06T 3/147* (2024.01)
*G06T 7/73* (2017.01)
*G06V 10/24* (2022.01)
*G06V 10/774* (2022.01)

(52) U.S. Cl.
CPC ............... *G06T 3/147* (2024.01); *G06T 7/73* (2017.01); *G06V 10/243* (2022.01); *G06V 10/774* (2022.01); *G06T 2207/20081* (2013.01); *G06T 2207/30201* (2013.01)

(56) References Cited

U.S. PATENT DOCUMENTS

| | | | | |
|---|---|---|---|---|
| 2018/0158246 | A1* | 6/2018 | Grau | G06T 3/18 |
| 2018/0302614 | A1* | 10/2018 | Toksvig | H04N 23/698 |
| 2019/0138107 | A1* | 5/2019 | Nietfeld | G06F 3/0346 |
| 2019/0180448 | A1* | 6/2019 | Ro | G06V 40/20 |
| 2019/0295323 | A1* | 9/2019 | Gutierrez | G02B 27/017 |
| 2019/0377345 | A1* | 12/2019 | Bachrach | B64C 39/024 |
| 2021/0374390 | A1* | 12/2021 | Dai | G06T 5/50 |

FOREIGN PATENT DOCUMENTS

| | | |
|---|---|---|
| CN | 106231317 A | 12/2016 |
| CN | 108230254 A | 6/2018 |
| JP | 2003052055 A | 2/2003 |
| JP | 2012205229 A | 10/2012 |

OTHER PUBLICATIONS

"Information technology—Coded representation of immersive media—Part 2: Omnidirectional media format", ISO/IEC DIS 23090-2, ISO/IEC JTC 1/SC 29 Coding of audio, picture, multimedia and hypermedia information, 2020, 286 pages.

International Search Report and Written Opinion of PCT Application No. PCT/JP2019/032180, issued on Nov. 5, 2019, 14 pages of ISRWO.

Dupuis, et al., "Robust Radial Face Detection for Omnidirectional Vision", Transactions on Image Processing, IEEE, vol. 22, No. 5, May 2013, pp. 1808-1821.

Liu Yang, "Key Technology of Wide Angle Image Mosaic Research and Implementation", Chinese Master's Theses Full-text Database, Information Science and Technology, No. 02, Feb. 15, 2017.

* cited by examiner

FIG.3

| IMAGE ID | IMAGE DATA | PART INFORMATION | | | |
|---|---|---|---|---|---|
| | | EYES | NOSE | MOUTH | ... |
| ... | ... | ... | ... | ... | ... |
| A01 | B01 | C01 | D01 | E01 | ... |
| A02 | B02 | C02 | D02 | E02 | ... |
| A03 | B03 | C03 | D03 | E03 | ... |
| ... | ... | ... | ... | ... | ... |

| IMAGE ID | LEARNING DATA ID | IMAGE DATA | ANGLE INFORMATION ||| POST-TRANS-FORMATION PART INFORMATION |
|---|---|---|---|---|---|---|
| | | | PITCH | ROLL | YAW | |
| ... | ... | ... | ... | ... | ... | ... |
| A01 | F01 | G01 | 0 | 0 | 0 | H01 |
| | F02 | G02 | 1 | 0 | 0 | H02 |
| | F03 | G03 | 2 | 0 | 0 | H03 |
| ... | ... | ... | ... | ... | ... | ... |

122

FIG.5
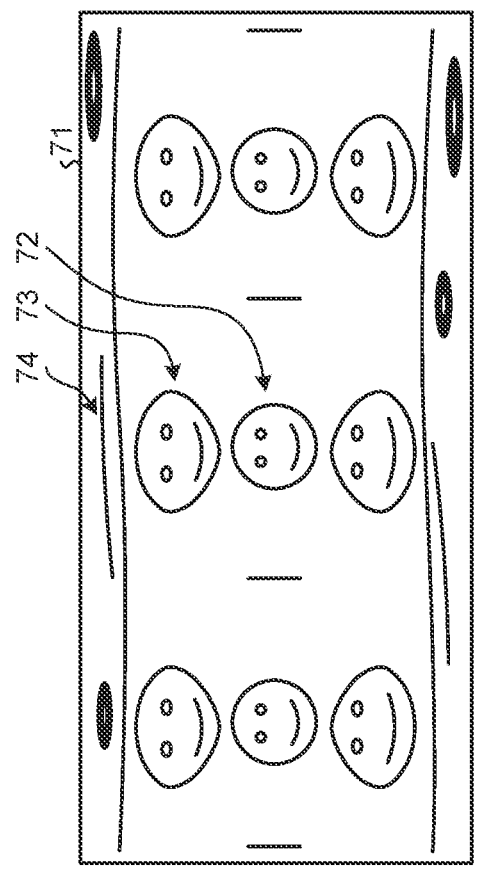
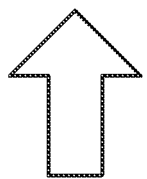
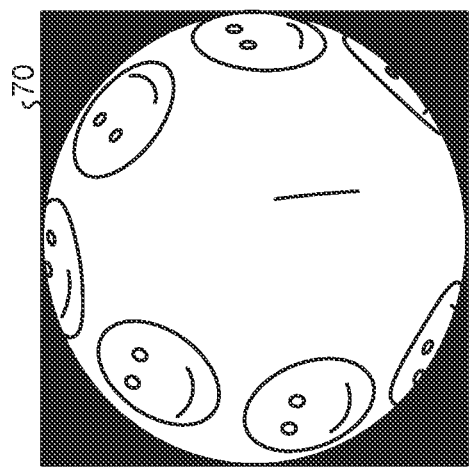

IMAGE PROCESSING APPARATUS AND IMAGE PROCESSING METHOD

CROSS REFERENCE TO RELATED APPLICATIONS

This application is a U.S. National Phase of International Patent Application No. PCT/JP2019/032180 filed on Aug. 16, 2019, which claims priority benefit of Japanese Patent Application No. JP 2018-157652 filed in the Japan Patent Office on Aug. 24, 2018. Each of the above-referenced applications is hereby incorporated herein by reference in its entirety.

FIELD

The present disclosure relates to an image processing apparatus, an image processing method, and an image processing program. For details, the present disclosure relates to processing of detecting a subject in video data.

BACKGROUND

With the widespread use of image capturing equipment, images have been widely used, for example, many users capture still images and moving images and upload the captured images on the Web. Use of the images may need deleting an unspecified number of persons or a predetermined target inappropriate for the subject captured in the images.

As a technique relating to such images, there has been proposed a technique of detecting a target unintended for the image capturing person from an image with the target captured therein, and deleting or replacing the target with another object (e.g., Non Patent Literature 1). Note that images that are present are not limited to images captured by a normal camera or the like, and thus include images each having an angle of view wider than that displayed on a display (hereinafter, collectively referred to as "wide angle view image"), such as spherical content (spherical images or spherical moving images) and panoramic images to be used in, for example, virtual reality (VR) technology (e.g., Non Patent Literature 2).

CITATION LIST

Non Patent Literature

Non Patent Literature 1: "Image Inpainting for Irregular Holes Using Partial Convolutions", Guilin Liu, Fitsum A. Reda, Kevin J. Shih, Ting-Chun Wang, Andrew Tao, Bryan Catanzaro.
Non Patent Literature 2: "Information technology-Coded representation of immersive media-Part 2: Omnidirectional media format", ISO/IEC FDIS 23090-2

SUMMARY

Technical Problem

However, with the above conventional technique, a target fails to be detected accurately in some cases. Typically, target detection processing to be performed includes generating a learned model obtained by learning the feature amount of a target to be detected (correct data), inputting data of an image or the like into the generated learned model, and determining whether or not the target is included in the image.

However, a wide angle view image such as spherical content is recorded in a format projection-transformed with an equirectangular projection scheme or the like, and thus a target is stretched or a target is in contact with each edge portion of the image. In such a case, the feature amount of an object to be detected (e.g., shape) is significantly different from the correct data, and thus the target may not be detected with a learned model corresponding to two-dimensional images obtained by typical perspective projection.

Therefore, the present disclosure proposes an image processing apparatus, an image processing method, and an image processing program that enables accurate detection of a target.

Solution to Problem

To solve the problem described above, an image processing apparatus includes: a learning-data creation unit configured to perform projection transformation on image data including a target as a subject, the learning-data creation unit being configured to create learning data including the target as correct data; and a model generation unit configured to generate, based on the learning data created by the learning-data creation unit, a learned model for detecting the target included in input data that includes a wide angle view image and is input to the learned model, the wide angle view image being created by projection transformation identical in scheme to the projection transformation by which the learning data is created.

BRIEF DESCRIPTION OF DRAWINGS

FIG. 3 illustrates an example of an image-data storage unit according to the first embodiment of the present disclosure.
FIG. 4 illustrates an example of a learning-data storage unit according to the first embodiment of the present disclosure.
FIG. 5 illustrates exemplary content projection-transformed with an equirectangular projection scheme.

DESCRIPTION OF EMBODIMENTS

Figure 1:
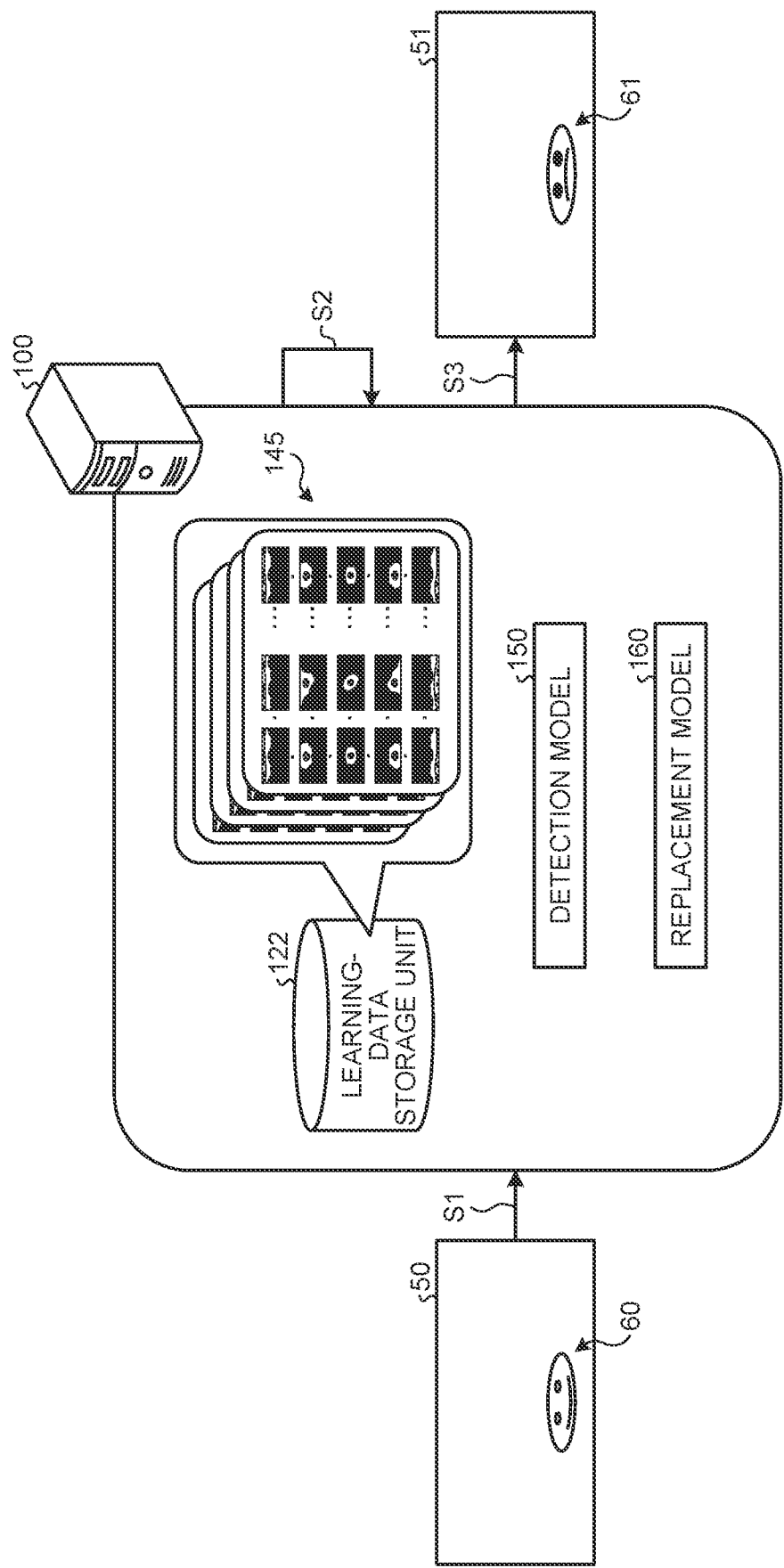
FIG. 1 illustrates the overview of image processing according to a first embodiment of the present disclosure.

Hereinafter, embodiments of the present disclosure will be described in detail with reference to the drawings. Note that in each of the following embodiments, the same reference signs are given to the same parts, and duplicate description thereof will be omitted.

1. First Embodiment

[1-1. Use of Wide Angle View Image]

Prior to the description of image processing according to the present disclosure, there will be described problems in using a wide angle view image (e.g., reproduction of a wide angle view image or distribution thereof to a user), as a premise of the image processing of the present disclosure.

Note that the wide angle view image according to the present disclosure is an image having an angle of view wider than that displayed on a display, such as spherical content and a panoramic image. In the present disclosure, spherical content will be described as an example of the wide angle view image.

The spherical content is generated by being shot with a spherical camera capable of shooting in 360° in all directions. The spherical content has an angle of view wider than that of a typical display (e.g., head mounted display (HMD) mounted on the user), and thus only a partial area trimmed in accordance with the size of the display (in other words, a field angle of view of the user). For example, the user views the spherical content while changing the display position by operating a touch display or while changing the display location by applying change of the line of sight or posture of the user via the mounted HMD.

Here, the spherical content is generated by being shot in 360° in all directions, and thus a situation occurs easily that an unintended subject is reflected in the spherical content, particularly when shooting outdoors. For example, in a case where the subject includes an unspecified number of persons, an issue such as portrait rights may occur. Furthermore, for example, even in a case where the subject includes a company's logo mark, trademark, or the like, the use of the spherical content with the subject captured therein may be restricted.

In order to avoid the above issues, the content creator artificially specifies a specific target (e.g., an unspecified number of persons or logo mark) captured in the image data, and performs effect processing such as mosaicing on the specified target. The performance of the effect processing such as the mosaicing, however, may impair the immersive feeling, which is one of the features of the spherical content.

In response to the above problems, on typical still images and moving images, in some cases, there is performed processing including automatically detecting a target by machine learning the feature amount of a specific target, deleting (masking) the detected target, and then replacing the deleted target with a substitute that can be shown naturally.

However, a wide angle view image such as spherical content is recorded in a format projected, for example, with an equirectangular projection scheme, and thus a target is stretched near the poles or a target is located at each edge portion of the image. Thus, in the case of executing the above approach, it needs repeating that the content creator designates a partial area at a predetermined angle of view, performs detection and replacement processing after transforming the designated area into perspective projection, and performs similar processing on another area. Thus, such an approach has an issue that the processing load is increased and image quality is deteriorated due to repeating the projection transformation.

Therefore, in order to solve the above problems, the image processing according to the present disclosure includes performing projection transformation corresponding to input data to be input into a learned model (hereinafter, simply referred to as "model"), on image data including a predetermined target as a subject, and creating learning data to be used for learning the model. Furthermore, the image processing according to the present disclosure includes generating a model for detecting the predetermined target included in the input data that is spherical content, on the basis of the created learning data. With the image processing according to the present disclosure, the detection is performed with the model learned by the learning data corresponding to a projection scheme for the spherical content (e.g., the equirectangular projection scheme), so that the target can be detected without performing perspective projection transformation on the spherical content. Hereinafter, the overview of the image processing according to the present disclosure will be described with FIG. 1. Note that in the present disclosure, there will be described an example in which one example of the target is "the faces of an unspecified number of persons".

1-2. Overview of Image Processing According to First Embodiment

An image processing apparatus 100 illustrated in FIG. 1 is an information processing apparatus that executes the image processing according to the present disclosure. The image processing apparatus 100 is, for example, an image server that provides a user with spherical content.

In the example illustrated in FIG. 1, the image processing apparatus 100 holds a detection model 150 and a replacement model 160 generated on the basis of learning data 145 stored in a learning-data storage unit 122. As will be described below in detail, the learning data 145 is an image set obtained by performing projection corresponding to a projection scheme (format) for spherical content, onto each face image set for learning (images obtained with a typical perspective projection scheme). For example, for one face image for learning, the image processing apparatus 100 generates images with the equirectangular projection scheme, the images having respective angles different in a pitch direction, a roll direction, and a yaw direction in the equirectangular projection scheme. Hereinafter, each of the generated face images may be referred to as a "distorted face image" because the face is distorted by the equirectangular projection.

That is, the image processing apparatus 100 performs learning with the learning data 145 that is a set of the distorted face images, instead of performing learning with a face image set for learning with a typical perspective projection scheme. Then, the image processing apparatus 100 generates the detection model 150 for determining whether or not the input data includes a feature amount indicating a "human face". Furthermore, the image processing apparatus 100 generates a replacement model 160 for replacing a detected face image.

In the example of FIG. 1, the image processing apparatus 100 accepts spherical content 50 stored with the equirectangular projection scheme (step S1). The spherical content 50 includes faces 60 of an unspecified number of persons.

The image processing apparatus 100 inputs the accepted spherical content 50 into the detection model 150 (step S2). As a result, the image processing apparatus 100 detects each face 60 included in the spherical content 50. Furthermore, the image processing apparatus 100 inputs the spherical content 50 into the replacement model and replaces the face 60 with face data having a feature amount similar to that of the face 60. Note that the image processing apparatus 100 may replace only a part of the face 60 (e.g., eyes), instead of replacing the whole face 60. As an example, the image processing apparatus 100 replaces a part of the face 60 on the basis of the mean value of the feature amounts of parts in a plurality of images within the learning data 145 having angle information similar to that of the face 60.

Then, the image processing apparatus 100 generates spherical content 51 with the face 60 replaced with a face 61. Then, the image processing apparatus 100 outputs the spherical content 51 (step S3). For example, as spherical content distributed to the user, the image processing apparatus 100 distributes the spherical content 51 with the face 61 replaced, instead of the spherical content 50. As a result, the image processing apparatus 100 can prevent a situation in which the user views the face 60 mistakenly captured in the spherical content 50. Furthermore, the image processing apparatus 100 performs the detection and replacement processing on the spherical content 50 stored with the equirectangular projection scheme, without time and effort, for example, performing perspective projection transformation on the spherical content 50. As a result, the image processing apparatus 100 can prevent deteriorating the image quality of the spherical content 50 and can perform processing speedily.

1-3. Configuration of Image Processing System According to First Embodiment

Subsequently, the image processing apparatus 100 according to the present disclosure and an image processing system 1 according thereto will be described in detail with FIG. 2 and the subsequent figures.

Figure 2:
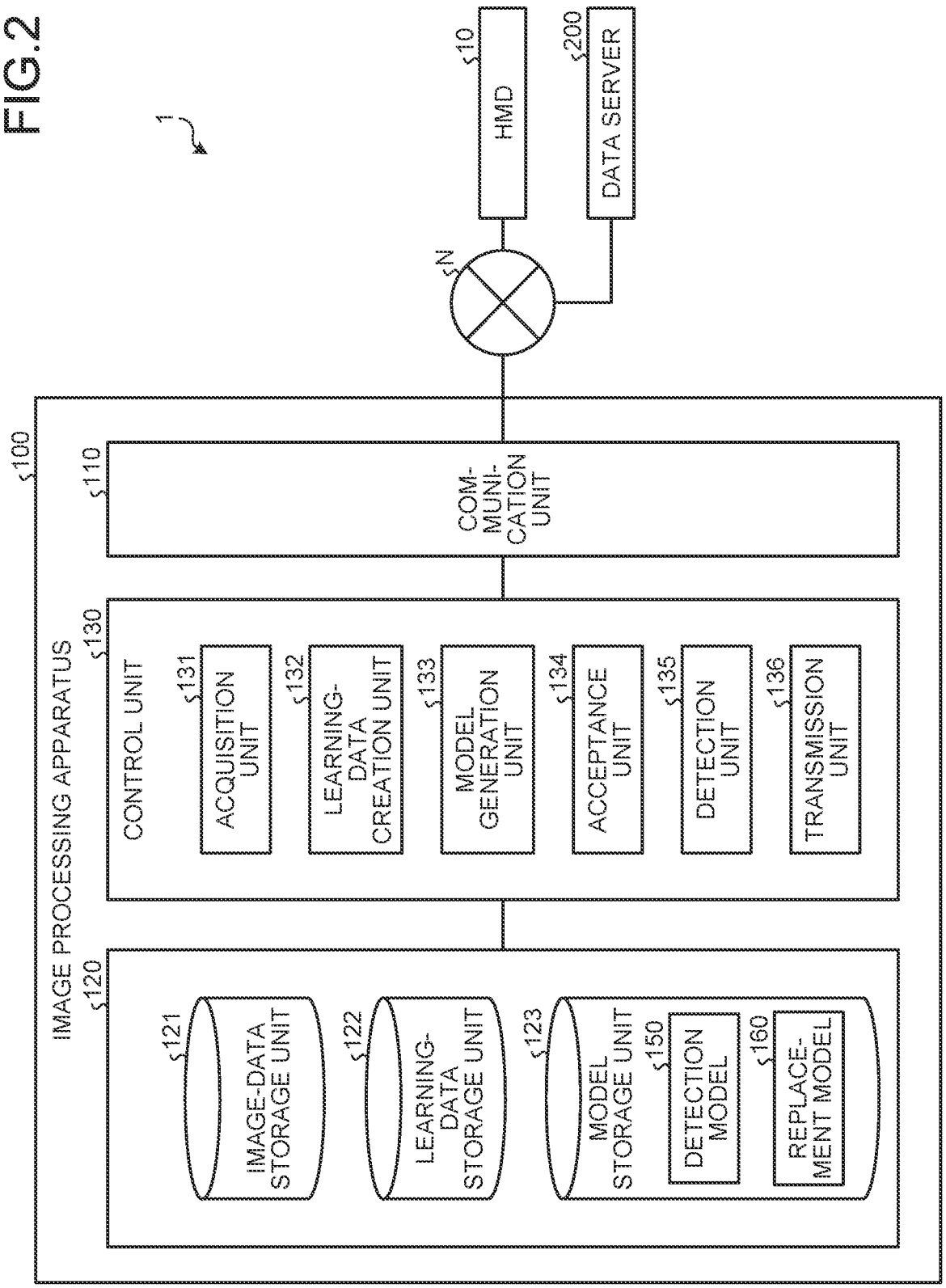
FIG. 2 is a diagram illustrating an example of an image processing system according to the first embodiment of the present disclosure.

FIG. 2 is a diagram illustrating an example of the image processing system 1 according to the first embodiment of the present disclosure. As illustrated in FIG. 2, the image processing system 1 includes an HMD 10, a data server 200, and the image processing apparatus 100.

The HMD 10 is a display apparatus to be mounted on the user's head and is a so-called wearable computer. The HMD 10 achieves display processing in response to the orientation and movement of the user's body, the moving speed of the user, and the like.

The data server 200 is information equipment connected to the image processing apparatus 100 and the HMD 10 by a wired or wireless network. The data server 200 is a storage server that accumulates image data for learning and provides the accumulated image data to the image processing apparatus 100. Furthermore, the data server 200 may be a service server that provides content such as moving images to a user who uses the HMD 10.

As described above, the image processing apparatus 100 is the information processing apparatus that creates learning data corresponding to the spherical content to be the target of the detection processing and generates a model on the basis the created learning data. The image processing apparatus 100, for example, inputs spherical content that is about to be distributed to the user into a detection model, detects the faces of an unspecified number of persons included in the spherical content, and replaces or deletes each detected face. Then, the image processing apparatus 100 distributes the spherical content having subjected to the replacement processing and the like to the user.

As illustrated in FIG. 2, the image processing apparatus 100 includes a communication unit 110, a storage unit 120, and a control unit 130. Note that the image processing apparatus 100 may include an input unit (e.g., a keyboard or a mouse) that accepts various operations from an administrator or the like who administers the image processing apparatus 100, and a display unit (e.g., a liquid crystal display) for displaying various types of information.

The communication unit 110 is achieved by, for example, a network interface card (NIC). The communication unit 110 is connected to a network N (e.g., the Internet) in a wired or wireless manner, and exchange information between the data server 200, the HMD 10, and the like via the network N.

The storage unit 120 is realized by, for example, a semiconductor memory element such as a random access memory (RAM) or a flash memory, or a storage device such as a hard disk or an optical disk. The storage unit 120 includes an image-data storage unit 121, a learning-data storage unit 122, and a model storage unit 123. Hereinafter, each of the storage units will be described in the above order.

The image-data storage unit 121 stores image data as the original of learning data created by the image processing apparatus 100. The original of image data is, for example, face image data to be distributed as a sample of correct data for machine learning. Such face image data for machine learning is, for example, data in which a label serving as a correct answer of the image (e.g., information indicating that the subject of the image is a person's face) is added to the image data. Note that the correct label may include attribute information of the person as the subject (e.g., the race, age, or gender of the person as the subject).

FIG. 3 illustrates an example of the image-data storage unit 121 according to the first embodiment. FIG. 3 is the example of the image-data storage unit 121 according to the first embodiment of the present disclosure. The example illustrated in FIG. 3, the image-data storage unit 121 has items such as "image ID", "image data", and "part information".

The "image ID" indicates identification information for identifying an image. The "image data" indicates actual data of an image including the image. For example, the actual data includes the number of pixels including an image, color information of each of the pixels, and the like. Note that in FIG. 3, the item of image data is represented by a concept such as "B01"; however, actually, the item of image data stores detained data regarding the pixels.

The "part information" indicates information regarding each part included in a face image. For example, the part information includes position information indicating the position of the eyes, nose, or mouth of a subject (information indicating which position (pixels) in the image indicates the part), color information, and the like. Note that in FIG. 3, the respective pieces of data of items of the part information indicating the eyes, the nose, and the mouth are represented by concepts such as "C01", "D01", and "E01"; however, actually, each of the items stores specific information corresponding to the item. For example, the item of eyes stores position information of pixels corresponding to the eyes of a person (e.g., information of an area assumed to indicate the eyes in an image), color information of each of the pixels, and the like.

Furthermore, in the example of FIG. 3, the information regarding the eyes, the nose, and the mouth is indicated as the part information; however, the part information is not limited to the example. For example, the image-data storage unit 121 may store position information, color information, and the like of the eyebrows, the ears, and the like of a human face. In addition, information stored in face image data distributed in advance for learning may be used as part information, or part information may be information set artificially.

That is, as the example of the data stored in the image-data storage unit 121, FIG. 3 illustrates that an image identified by an image ID "A01" has image data "B01", and "C01" for the eyes, "D01" for the nose, and "E01" for the mouth as the pieces of the part information. Note that although not illustrated in FIG. 3, the face image may include attribute information such as the race, age, gender, or skin color of the person as the subject.

Next, the learning-data storage unit 122 will be described. The learning-data storage unit 122 stores learning data created with an original image stored in the image-data storage unit 121 and corresponding to the projection scheme for a wide angle view image to be input into a model. In other words, the learning-data storage unit 122 stores, as learning data, an image data group obtained with the projection scheme identical to that for a wide angle view image to be input into a model.

FIG. 4 illustrates an example of the learning-data storage unit 122 according to the first embodiment of the present disclosure. In the example illustrated in FIG. 4, the learning-data storage unit 122 has items such as "image ID", "learning data ID", "image data", "angle information", and "post-transformation part information".

The "image ID" indicates identification information for identifying an image and corresponds to the same item illustrated in FIG. 3. The "learning data ID" indicates identification information for identifying each learning data. The "image data" indicates the actual data of constituent images included in learning data. Such items one-to-one correspond to the same items illustrated in FIG. 3.

The "angle information" indicates information regarding angles set in each learning data. As illustrated in FIG. 1, learning data includes images each obtained by projection-transforming an original face image with the equirectangular projection scheme, and, for example, created by changing by 1° for each of pitch, roll, and yaw elements. Therefore, each piece of learning data has angle information indicating how much the angles deviate from those of the original face image (e.g., a state having a pitch of 0°, a roll of 0°, and a yaw of 0°). For example, learning data having a pitch of 45° is an image in which a face is shifted by 45° in the pitch direction (upward in the image) from the original face image. In addition, the learning data includes a face distorted by projection-transforming the original face shifted from the center of the image. For example, with the equirectangular projection scheme, as the original face closer to the upper or lower edge portion of the image (as the pitch angle approaches 90° or −90°), the transformed face is stretched laterally. As a result, the learning data includes a distorted face image.

The "pitch" "roll", and "yaw" each indicate a direction in which the subject of an original image is shifted. The pitch indicates the longitudinal direction in a two-dimensional image. For example, regarding the pitch direction, with the center in the longitudinal direction of the image defined as 0°, the upper edge portion of the image indicates 90° and the lower edge portion thereof indicates −90°. In addition, the roll indicates rotation in a two-dimensional image. For example, regarding the roll direction, with the face image in an initial state defined as 0° and 360° defined as one rotation, the angle increases as the amount of shifting in clockwise rotation increases. In addition, the yaw indicates the lateral direction in a two-dimensional image. For example, regarding the yaw direction, with the center in the lateral direction of the image defined as 0° and 180° defined as one round, the angle increases as the amount of right shifting increases. For example, when the face located at the center reaches the opposite state (a state in which the face image is equally divided laterally), the yaw angle is 180°.

The "post-transformation part information" indicates, for example, position information of each part of the face after projection transformation. FIG. 4 illustrates the post-transformation part information as one item; however, the post-transformation information includes, for example, respective pieces of position information for the eyes, the nose, and the mouth. Note that if part information of the original face image is known, the post-transformation part information is obtained by calculating numerical values (coordinates) indicating, for example, to which positions original pixels are shifted after the face information is projection-transformed.

That is, as an example of the data stored in the learning-data storage unit 122, FIG. 4 illustrates that the pieces of learning data one-to-one identified with learning data IDs "F01", "F02", and "F03" are created from the image identified with the image ID "A01". Furthermore, learning data identified with a learning data ID "F01" indicates image data "G01", a pitch of "0°", a roll of "0°", a yaw of "0°", and post-transformation part information "H01". Note that although not illustrated in FIG. 4, the learning data may include attribute information such as the race, age, gender, or skin color of the person as the subject, similarly to the original image data.

Next, the model storage unit 123 will be described. The model storage unit 123 stores the learned model generated by the image processing apparatus 100. For example, the model storage unit 123 stores the detection model 150 and the replacement model 160.

Note that the model storage unit 123 may store a plurality of types of detection models 150 and a plurality of types of replacement models 160. For example, the model storage unit 123 stores a plurality of different detection models 150 and a plurality of different replacement models 160 in accordance with the format (projection scheme) of a wide angle view image to be input into such models. Furthermore, as will be described below in detail, when replacing a face, the model storage unit 123 performs replacement with an image corresponding to an angle of the detected face, and thus stores a plurality of replacement models 160 generated on an angle basis.

Referring back to FIG. 2, the explanation will be continued. The control unit 130 is achieved by a central processing unit (CPU), a micro processing unit (MPU), or the like executing a program (e.g., image processing program according to the present disclosure) stored in the image processing apparatus 100, in the random access memory (RAM) or the like as a working area. Furthermore, the control unit 130 is a controller, and, for example, may be achieved by an integrated circuit such as an application specific integrated circuit (ASIC) or a field programmable gate array (FPGA).

As illustrated in FIG. 2, the control unit 130 includes an acquisition unit 131, a learning-data creation unit 132, a model generation unit 133, an acceptance unit 134, a detection unit 135, and a transmission unit 136, and achieves or executes the functions and actions of information processing described below. Note that the internal configuration of the control unit 130 is not limited to that illustrated in FIG. 2, and thus may be another configuration if the image processing described below is performed with the other configuration.

The acquisition unit 131 acquires various types of information via, for example, a wired or wireless network. For example, the acquisition unit 131 acquires image data as the original of learning data, from the data server 200.

For example, the acquisition unit 131 acquires image data including a person as a subject. More specifically, the acquisition unit 131 acquires image data including a person's face as the subject. At this time, the acquisition unit 131 may acquire face image data including, for example, information regarding an area occupied by the face in the image, an area occupied by each part of the face in the image, and attribute information such as the race, gender, or age of the person. For example, the acquisition unit 131 acquires an image data group in which a plurality of face images are set, from the data server 200 or the like that provides a material for machine learning. Alternatively, the acquisition unit 131 may collect face image data by crawling the network and may acquire the collected face image data.

The learning-data creation unit 132 performs a predetermined projection transformation on image data having a predetermined target as a subject, and creates learning data including the predetermined target as correct data. Specifically, the learning-data creation unit 132 performs projection transformation corresponding to input data to be input into a model on image data including a predetermined target as a subject, and creates learning data to be used for learning the model.

For example, the learning-data creation unit 132 creates learning data from image data including a subject of a human face as a predetermined target. Note that the learning-data creation unit 132 may create learning data from image data in which position information of each part included in the human face is set. As a result, the learning-data creation unit 132 can create the learning data for detecting the human face from the image data and generating a model that can detect the positions of parts such as the human eyes and nose.

For example, the learning-data creation unit 132 accepts a setting regarding a projection scheme for a wide angle view image targeted by a model to be generated, transforms original image data with the projection scheme identical to the accepted projection scheme, and creates learning data.

Specifically, the learning-data creation unit 132 changes an angle of the subject from an initial state thereof, performs projection transformation on image data corresponding to the changed angle, and creates learning data. As a result, the learning-data creation unit 132 can create the learning data for generating a model directly executable detection processing even on input data including a distorted person's face, without performing transformation processing such as perspective projection before the detection processing.

More specifically, the learning-data creation unit 132 changes the respective angles in the pitch direction, the roll direction, and the yaw direction of the subject, performs projection transformation on image data corresponding to the changed angle, and creates learning data. For example, the learning-data creation unit 132 changes respective angles in the pitch direction, the roll direction, and the yaw direction by 1°, and creates an image group corresponding to the changed angles. As a result, the learning-data creation unit 132 can obtain a learning data set of 180 pieces different in pitch direction from one piece of original image, a learning data set of 180 pieces different in roll direction for each image of the first learning data set, and a learning data set of 180 pieces different in yaw direction for each image of those learning data sets.

Note that regarding the yaw direction, the learning-data creation unit 132 may create learning data including only a range in which the subject is in contact with the image frame. This is because the feature amount of the subject simply shifted parallelly (with the yaw angle changed) without contact with the image frame is duplicated in the equirectangular projection scheme. In other words, the learning-data creation unit 132 may create learning data including only an image with the subject divided into two and in contact with the left and right edge portions. That is, the learning-data creation unit 132 does not need to create learning data with only the yaw angles changed, if the subject is not in contact with the image frame. Specifically, the learning-data creation unit 132 may create learning data while changing the angle in the yaw direction within a range from a state where the subject starts contacting the image frame to a state where the subject is away from the image frame. As a result, the learning-data creation unit 132 can reduce the processing load of creating the learning data.

Note that if the area occupied by the subject (object recognized as the subject) in the image is known, the learning-data creation unit 132 can determine whether the subject is in contact with the image frame (at the left and right edge portions of the image) or is away from the image frame.

As above, the learning-data creation unit 132 changes the angle of the subject from the initial state thereof, performs the projection transformation on the image data corresponding to the changed angle, and creates the learning data. That is, the learning-data creation unit 132 creates the subject-angle-based learning data set. As an example, when creating learning data from 10000 pieces of original image data, the learning-data creation unit 132 can create 10000 pieces of learning data having, for example, a pitch of 90°, a roll of 45°, and a yaw of 160°. The learning-data creation unit 132 can also create 10000 pieces of learning data at a pitch angle of 91°, a roll angle of 45°, and a yaw angle of 160°. The model generation unit 133 described below generates replacement models on an angle basis, with the angle-based learning data in such a manner.

Here, the details of the learning data created by the learning-data creation unit 132 will be visually described with reference to FIGS. 5 to 8. FIG. 5 illustrates exemplary content projection-transformed with the equirectangular projection scheme.

Content 70 illustrated in FIG. 5 is an image captured by, for example, an omnidirectional camera. As illustrated in FIG. 5, the content 70 has a spherical shape and such a state is unsuitable for distribution to the HMD 10 or reproduction on the HMD 10. Thus, typically, the content 70 is projection-transformed with a predetermined projection scheme, and transformed into a format suitable for distribution or reproduction.

Content 71 illustrates in FIG. 5 is an image obtained by projection-transforming the content 70 with the equirectangular projection scheme. In the equirectangular projection scheme, the latitude (vertical direction) and longitude (horizontal direction) of the original image are, respectively, directly transformed into the latitude (vertical direction) and longitude (horizontal direction) of the transformed image. Thus, the transformed image has an equidistance on the centerline in the vertical direction and at the position in the vertical direction (latitude); however, the object in the image is stretched (distorted) near the spherical poles.

The content 70 and the content 71 each include human faces. Note that although the original image to be actually used by the image processing apparatus 100 includes one face in one image, the example of FIG. 5 illustrates the content 70 and the content 71 each including the plurality of faces for the sake of explanation.

As illustrated in FIG. 5, a face 72 located at the center of the latitude of the content 70 maintains an almost accurate shape on the content 71. On the other hand, in the content 70, a face 73 located at a higher latitude than the face 72 has a shape of which portion is more distorted as the portion is located at a higher latitude on the content 71. Furthermore, in the content 70, a face 74 located at a higher latitude (closer to the pole) than the face 73 has a more distorted shape than that of the face 73 on the content 71.

The learning-data creation unit 132 learns a face having a distorted shape as above, and thus creates a distorted face image as learning data. As described above, the learning-data creation unit 132 changes the angles set to the original image, and obtains a distorted face image by projection-transforming the changed image.

Figure 6:
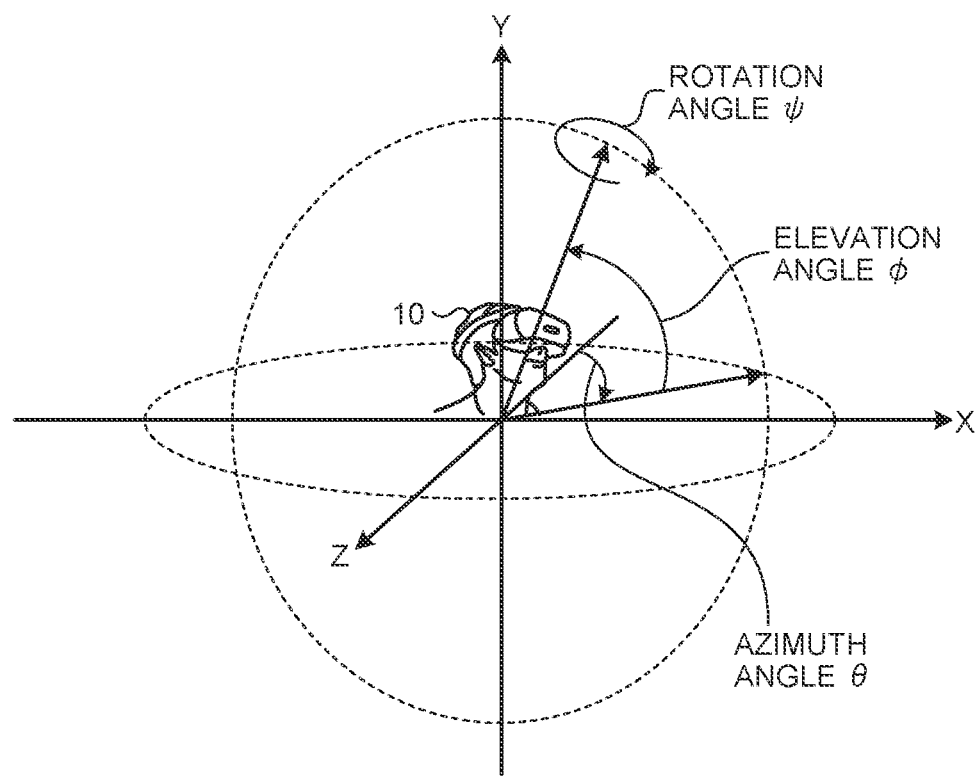
FIG. 6 illustrates a relationship between a wide angle view image and the eye point of a user.

Here, a relationship between a wide angle view image like the content 70 and the eye point of the user will be described with reference to FIG. 6. FIG. 6 illustrates the relationship between the wide angle view image and the eye point of the user. Note that in the example of FIG. 6, there will be described spherical content is taken as an example of the wide angle view image.

As illustrated in FIG. 6, the eye point of the user at the spherical content is represented by using the elevation angle $\phi$, the rotation angle $\Psi$, and the azimuth angle $\theta$. The elevation angle $\phi$ is an angle in the longitudinal direction with the XZ plane of the 3D model coordinate system illustrated in FIG. 6 defined as a reference plane. Furthermore, the rotation angle $\Psi$ is an angle indicating a rotation direction around the user's line of sight in the 3D model coordinate system illustrated in FIG. 6. Still furthermore, the azimuth angle $\theta$ is an angle from a predetermined reference axis on the XZ plane that is the horizontal plane of the 3D model coordinate system illustrated in FIG. 6. In the present disclosure, the elevation angle $\phi$, the rotation angle $\Psi$, and the azimuth angle $\theta$ correspond to an angle in the pitch direction, an angle in the roll direction, and an angle in the yaw direction, respectively.

Figure 7:
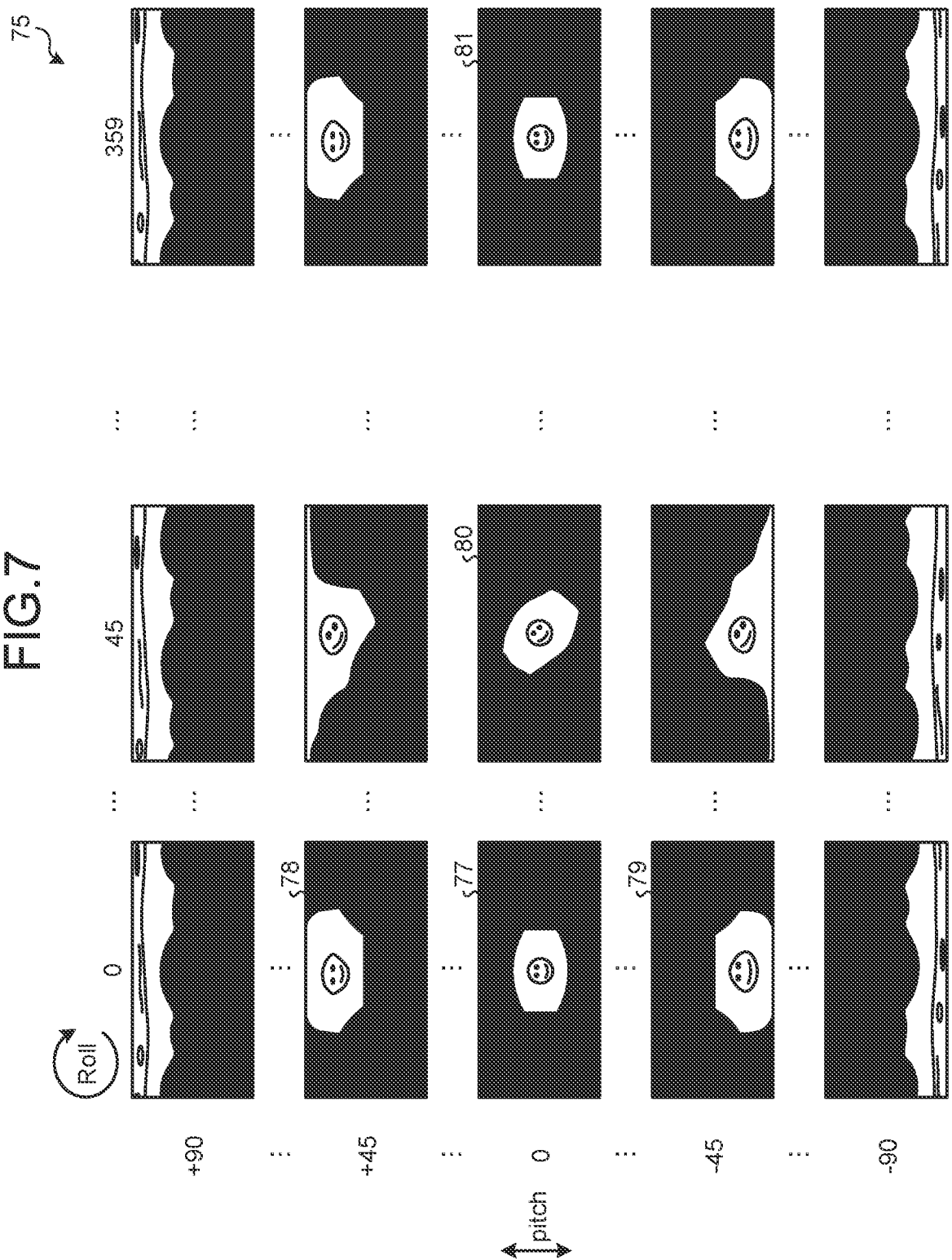
FIG. 7 is an explanatory illustration (1) of creation processing according to the first embodiment of the present disclosure.

Subsequently, distorted face images created by the learning-data creation unit 132 will be described with reference to FIG. 7. FIG. 7 is an explanatory illustration (1) of the creation processing according to the first embodiment of the present disclosure.

FIG. 7 visually illustrates angles set to each distorted face image created by the learning-data creation unit 132 and what kinds of distorted face images are created actually. First, FIG. 7 illustrates an example in which the learning-data creation unit 132 creates each distorted face image while changing an angle in the pitch direction and an angle in the roll direction.

For example, the learning-data creation unit 132 reads an image having an angle of 0° in the pitch direction and an angle of 0° in roll direction as an initial state, and creates a distorted face image 77. The face included in the distorted face image 77 has a shape with almost no distortion.

Thereafter, the learning-data creation unit 132 sequentially creates distorted face images while changing the angle in the pitch direction of the original image every 1°. A distorted face image 78 illustrated in FIG. 7 is a distorted face image created from an image having an angle of 45° in the pitch direction and an angle of 0° in the roll direction. The shape of the face included in the distorted face image 78 corresponds to, for example, the shape of the face 72 illustrated in FIG. 5, and has larger distortion as the face is closer to the pole. On the other hand, a distorted face image 79 illustrated in FIG. 7 is a distorted face image created from an image having an angle of −45° in the pitch direction and an angle of 0° in the roll direction. The shape of the face included in the distorted face image 79 has larger distortion as a portion of the face is located in the opposite direction (downward direction) to the shape of the face included in the distorted face image 78 (location further closer to the lower pole).

After creating distorted face images for all the angles in the pitch direction, the learning-data creation unit 132 sets these distorted face images as one set of learning data, and further creates distorted face images with the angles in the roll direction changed.

A distorted face image 80 illustrated in FIG. 7 is a distorted face image created from an image having an angle of 0° in the pitch direction and an angle of 45° in the roll direction. The shape of the face included in the distorted face image 80 is shifted clockwise by 45° and accordingly, some distortion occurs. The learning-data creation unit 132 creates distorted face images for all the angles in the roll direction for each distorted face image set corresponding to all the angles in the pitch direction. A distorted face image 81 illustrated in FIG. 7 is a distorted face image created from an image having an angle of 0° in the pitch direction and an angle of 359° in the roll direction.

In such a manner, the learning-data creation unit 132 creates the distorted face images corresponding to all the angles, and thus the learning-data creation unit 132 can creates data for accurately learning the feature amount of a face included in an image with projection transformation performed similar to that performed on the distorted face images. For example, for an object present at the pitch angle of near 90° or −90° and normally difficult to recognize as a human face, the learning-data creation unit 132 can create learning data indicating the feature amount of the object.

Figure 8:
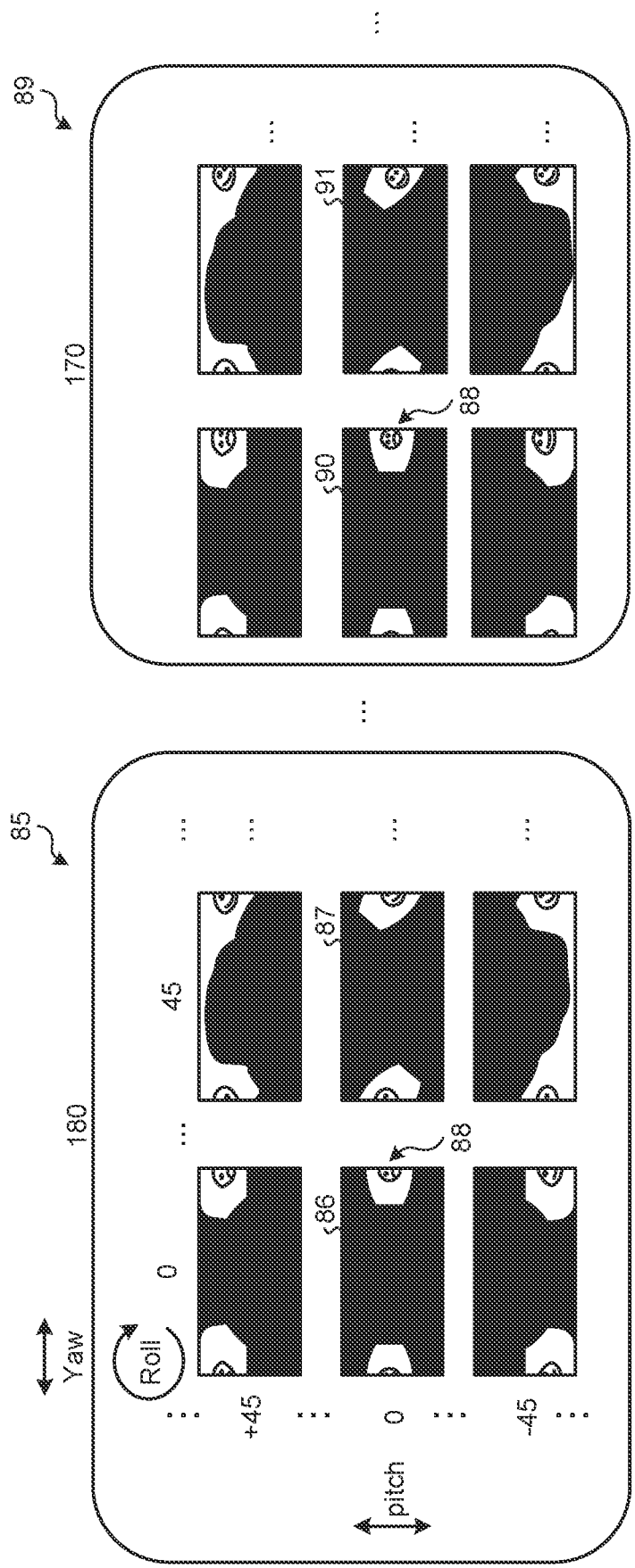
FIG. 8 is an explanatory illustration (2) of the creating processing according to the first embodiment of the present disclosure.

Subsequently, each distorted face image with an angle in the yaw direction changed will be described with reference to FIG. 8. FIG. 8 is an explanatory illustration (2) of the creation processing according to the first embodiment of the present disclosure. FIG. 8 visually illustrates, among the distorted face images created by the learning-data creation unit 132, distorted face images each including a face divided and presented at the left and right edge portions of the image, due to change of an angle in the yaw direction.

A distorted face image 86 illustrated in FIG. 8 is a distorted face image created from an image having an angle of 0° in the pitch direction, an angle of 0° in the roll direction, and an angle of 180° in the yaw direction. Note that in the present disclosure, having an angle of 180° in the yaw direction indicates that the centerline in the vertical direction of the original image has moved to just the right edge portion of the image. Thus, a face 88 included in the distorted face image 86 is exactly divided into two at the left and right edge portions of the distorted face image 86.

Note that the learning-data creation unit 132 creates distorted face images each having an angle of 180° in the yaw direction, for the distorted face images different in angle in the pitch direction and the roll direction. For example, a distorted face image 87 illustrated in FIG. 8 is a distorted face image created from an image having an angle of 0° in the pitch direction, an angle of 45° in the roll direction, and an angle of 180° in the yaw direction.

Furthermore, the learning-data creation unit 132 sequentially creates distorted face images while changing the angle in the yaw direction of the original image every 1°. A distorted face image 90 illustrated in FIG. 8 is a distorted face image having an angle of 0° in the pitch direction, an angle of 0° in the roll direction, and an angle of 180° in the yaw direction. In this case, a face 88 included in the distorted face image 90 has an area occupied in the right edge portion of the distorted face image 90 that is wider than that occupied in the left edge portion thereof.

Note that for the images different in angle in the yaw direction, the learning-data creation unit 132 may create distorted face images with all the angles changed, or may create distorted face images within a range from a state where a face 88 starts contacting either the right edge portion or the left edge portion to a state where the face 88 is away from the edge portion. That is, the learning-data creation unit 132 creates only distorted face images with which the respective feature amounts of the faces 88 that have been divided can be learned, and needs not to create distorted face images each including a non-divided face 88.

As described above, from the original image, the learning-data creation unit 132 creates, as learning data, distorted face images subjected to the projection transformation while changing the respective settings in the pitch direction, the roll direction, and the yaw direction.

Referring back to FIG. 2, the explanation will be continued. The model generation unit 133 generates, on the basis of the learning data created by the learning-data creation unit 132, a learned model for detecting a predetermined target included in input data that includes a wide angle view image and is input to the learned model, the wide angle view image being created by projection transformation identical in scheme to the projection transformation by which the learning data is created. Specifically, on the basis of the learning data created by the learning-data creation unit 132, the model generation unit 133 generates a model (detection model 150) for detecting a predetermined target included in input data that is a wide angle view image.

For example, the model generation unit 133 generates a plurality of detection models 150 on a type basis of projection transformation, the plurality of detection models 150 being different from each other. Specifically, in a case where spherical content to be a target of face detection is image data obtained by transformation with the equirectangular projection scheme, the model generation unit 133 generates a detection model 150 corresponding to the equirectangular projection scheme, with learning data obtained by transformation with the equirectangular projection scheme.

Furthermore, the model generation unit 133 may generate, on the basis of the learning data created by the learning-data creation unit 132, a replacement model 160 for replacing entirely or partially a predetermined target detected by the detection unit 135 described below.

For example, on the basis of learning data created on an angle basis by the learning-data creation unit 132, the model generation unit 133 generates a plurality of replacement models on an angle basis, the plurality of replacement models being different from each other. As a result, the model generation unit 133 can replace an image in accordance with the angle of the detected subject, and thus can execute natural replacement without any discomfort in appearance.

Figure 9:
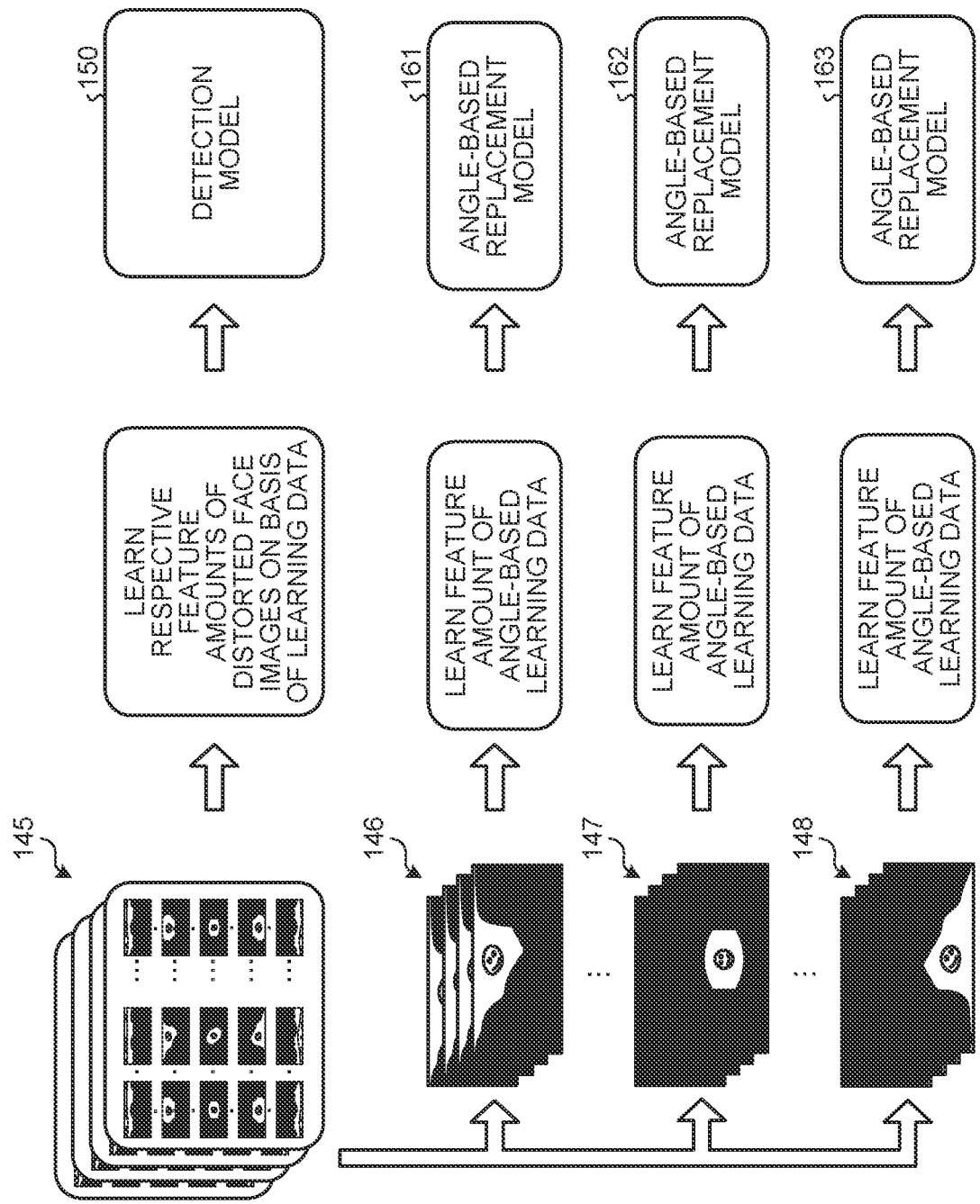
FIG. 9 explanatorily illustrates generation processing according to the first embodiment of the present disclosure.

This generation processing will be described with reference to FIG. 9. FIG. 9 explanatorily illustrates the generation processing according to the first embodiment of the present disclosure.

As illustrated in FIG. 9, the model generation unit 133 generates a detection model 159 by learning the respective feature amounts of the distorted face images on the basis of learning data 145.

The model generation unit 133 also generates a replacement model 160 with learning data 146, learning data 147, or learning data 148. The learning data 146 is, for example, a learning data set of distorted face images created from an original image and a pitch angle of 45°, a roll angle of 45°, and a yaw angle of 0° are set to each of the distorted face images. The learning data 147 is, for example, a learning data set of distorted face images created from the original image and a pitch angle of 0°, a roll angle of 0°, and a yaw angle of 0° are set to each of the distorted face images. The learning data 148 is, for example, a learning data set of distorted face images created from the original image and a pitch angle of −45°, a roll angle of 45°, and a yaw angle of 0° are set to each of the distorted face images.

For example, the model generation unit 133 learns the feature amount of the angle-based learning data 146, and generates an angle-based replacement model 161. For example, when a face detected by the detection model 150 indicates the feature amount similar to a face having a pitch angle of 45°, a roll angle of 45°, and a yaw angle of 0°, the angle-based replacement model 161 calculates data for face replacement (e.g., the mean value of the feature amounts of faces included in the learning data 146) based on the learning data 146, and performs face replacement processing. Similarly, the model generation unit 133 learns the feature amount of the angle-based learning data 147, generates an angle-based replacement model 162, learns the feature amount of the angle-based learning data 148, and generates an angle-based replacement model 163. As a result, even in a case where a detected face is distorted, the model generation unit 133 can generate a model for performing natural replacement corresponding to the distortion.

Furthermore, the model generation unit 133 may generate a model so as to replace an image in accordance with attribute information of a detected target. For example, in a case where a target is a human face, on the basis of the feature amount of a detected person's face, the image processing apparatus 100 can estimate the race, gender, or age of the person. In such a case, the model generation unit 133 may generate a model so as to narrow down the estimated race, gender, age, or the like of the person in learning data, obtain, for example, the average of the feature amounts from the narrowed-down learning data, and perform replacement with the obtained average.

Furthermore, the model generation unit 133 may generate a model for replacing only a part instead of replacing entirely a detected face. For example, the model generation unit 133 learns the feature amount of a part indicating the eyes of a person on the basis of angle-based learning data. Then, in a case where a face is detected in input data, the model generation unit 133 may generate a model for replacement with, for example, the mean value of the feature amounts each obtained by learning only the eyes included in the detected face. As a result, the model generation unit 133 can generate a replacement model that can perform more natural replacement processing (e.g., the pupil colors before and after replacement are in common).

Figure 10:
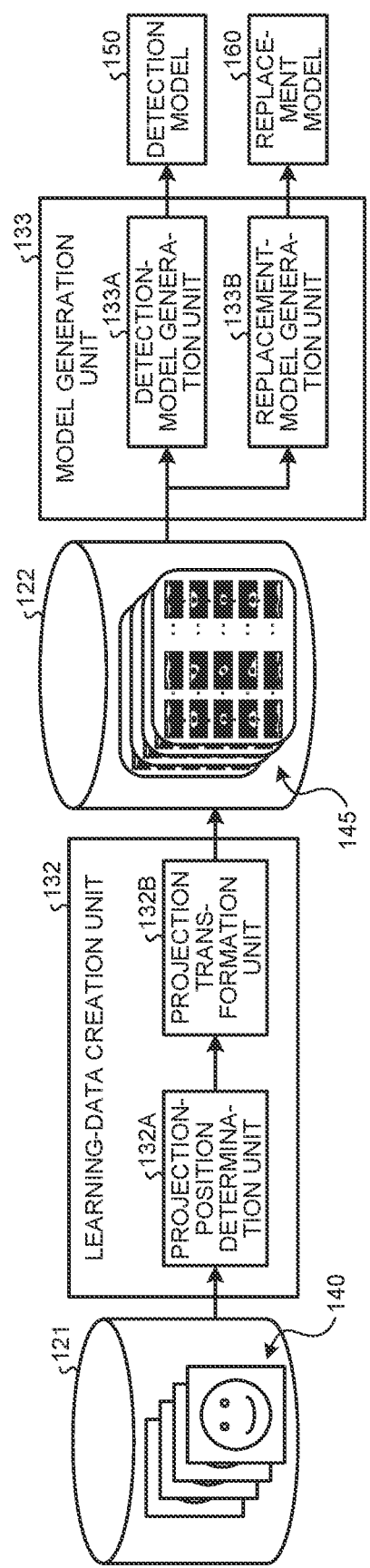
FIG. 10 explanatorily illustrates a flow of the creation processing and the generation processing according to the present disclosure.

Here, a flow of information processing executed by the learning-data creation unit 132 and the model generation unit 133 will be described with reference to FIG. 10. FIG. 10 explanatorily illustrates the creation processing and the generation processing according to the present disclosure. For the sake of explanation, FIG. 10 illustrates the learning-data creation unit 132 including two processing units of a projection-position determination unit 132A and a projection transformation unit 132B. It is also illustrated that the model generation unit 133 includes two processing units of a detection-model generation unit 133A and a replacement-model generation unit 133B.

First, the learning-data creation unit 132 refers to the image-data storage unit 121 and reads image data 140 as the original of learning data.

For one piece of image data, the projection-position determination unit 132A creates image data with an angle changed stepwise, starting from an initial state of the one piece of image data. For example, the projection-position determination unit 132A creates one piece of image data with the pitch angle increased by 1°. Then, the projection-position determination unit 132A sends the created one piece of image data to the projection transformation unit 132B.

The projection transformation unit 132B performs projection transformation on the one piece of image data sent from the projection-position determination unit 132A, with a preset projection transformation scheme. The projection transformation unit 132B stores the projection-transformed image data (learning data) in the learning-data storage unit 122.

Thereafter, for the same image data, the projection-position determination unit 132A creates image data with the angle further changed. For example, the projection-position determination unit 132A creates one piece of image data with the pitch angle further increased by 1°. Then, the projection-position determination unit 132A sends the created one piece of image data to the projection transformation unit 132B. The projection transformation unit 132B performs projection transformation on the one piece of image data sent from the projection-position determination unit 132A, with a projection transformation scheme similar to that described above. The projection transformation unit 132B stores the projection-transformed image data (learning data) in the learning-data storage unit 122.

The projection-position determination unit 132A and the projection transformation unit 132B repeat the above processing, and create, from the one piece of original image data, a learning data set subjected to projection transformation while changing an angle stepwise. Furthermore, the projection-position determination unit 132A sequentially acquires pieces of image data required for learning from the image-data storage unit 121, and repeats the above processing.

After sufficient learning data sets required for learning are created, the model generation unit 133 refers to the learning-data storage unit 122 and reads the learning data 145.

The detection-model generation unit 133A, on the basis of the distorted face image included in the learning data 145, learns each feature amount indicating the corresponding distorted face, and generates a detection model 150 for detecting a distorted face from any input data.

The replacement-model generation unit 133B learns the respective feature amounts of the angle-based distorted face images included in the learning data 145, and generates a replacement model 160 for performing replacement processing of replacing the detected face, with the mean value of the feature amounts.

Note that the learning approach performed by the detection-model generation unit 133A and the replacement-model generation unit 133B may be any known learning approach. For example, the detection-model generation unit 133A and the replacement-model generation unit 133B may generate a model with a deep neural network or the like. Alternatively, the detection-model generation unit 133A and the replacement-model generation unit 133B may generate a model with various learning algorithms such as support vector machine, clustering, and reinforcement learning.

Referring back to FIG. 2, the explanation will be continued. The acceptance unit 134 accepts various types of information. For example, the acceptance unit 134 accepts a wide angle view image to be the target of the detection processing. For example, in a case where the data server 200 distributes a wide angle view image to the HMD 10, the acceptance unit 134 accepts the wide angle view image before distribution in order to verify in advance whether an inappropriate subject is captured in the wide angle view image. The acceptance unit 134 sends the accepted wide angle view image to the detection unit 135, which is a subsequent processing unit.

The detection unit 135 detects a predetermined target from the input data, with a learned model (specifically, detection model 150) generated by the model generation unit 133.

For example, the detection unit 135 selects a detection model 150 corresponding to the type of the projection transformation performed on the input data from among the plurality of detection models 150 generated by the model generation unit 133, and detects the predetermined target with the selected detection model 150. Specifically, in a case where the wide angle view image accepted by the acceptance unit 134 is an image stored with the equirectangular projection scheme, the detection unit 135 selects a detection model 150 generated on the basis of learning data having subjected to projection transformation with the equirectangular projection scheme. Then, the detection unit 135 inputs the wide angle view image created with the equirectangular projection scheme into the selected detection model 150, and detects whether or not the predetermined target (e.g., a person's face) is present.

Furthermore, the detection unit 135 selects a replacement model 160 corresponding to the predetermined target detected from the input data from among the plurality of replacement models 160 generated by the model generation unit 133, and replaces the predetermined target, with the selected replacement model 160.

For example, the detection unit 135 calculates the angle information (pitch, roll, and yaw) of the target detected in the input data. Such calculation can be obtained from, for example, the feature amount of the detected target. Then, the detection unit 135 selects the replacement model 160 corresponding to the angle information of the detected target, and executes target replacement processing with the selected replacement model 160.

For example, the detection unit 135 executes replacement of the detected target, with, for example, the mean value of the feature amounts of targets included in angle-based learning data. Note that in the case of performing replacement processing, the detection unit 135 may refer to the feature amount of the detected target and may calculate an image to be replaced such that the detected target is replaced without any discomfort.

For example, in a case where the detected target is a person, replacement processing without considering the feature amount of the detected target may cause replacement with a person whose race, gender, or age is different significantly. Therefore, the detection unit 135 may refer to the feature amount of the detected target and extracts only learning data having a similar feature amount in order to reduce the discrepancy with the detected target, and may calculated replacement data from the mean value of the extracted learning data. Note that the detection unit 135 is not limited to using the mean value of the learning data and the like, and thus may calculate, with various known calculation approaches, replacement data for replacing the person of the detected target with a fictitious person.

In addition, the detection unit 135 may replace a portion included in the predetermined target that is detected from the input data. Specifically, in a case where the predetermined target is a person, the detection unit 135 may replace only the eyes or nose of the person.

The transmission unit 136 transmits the wide angle view image having been subjected to the detection processing and the replacement processing by the detection unit 135 to the HMD 10 or the like.

1-4. Procedure of Image Processing According to First Embodiment

Figure 11:
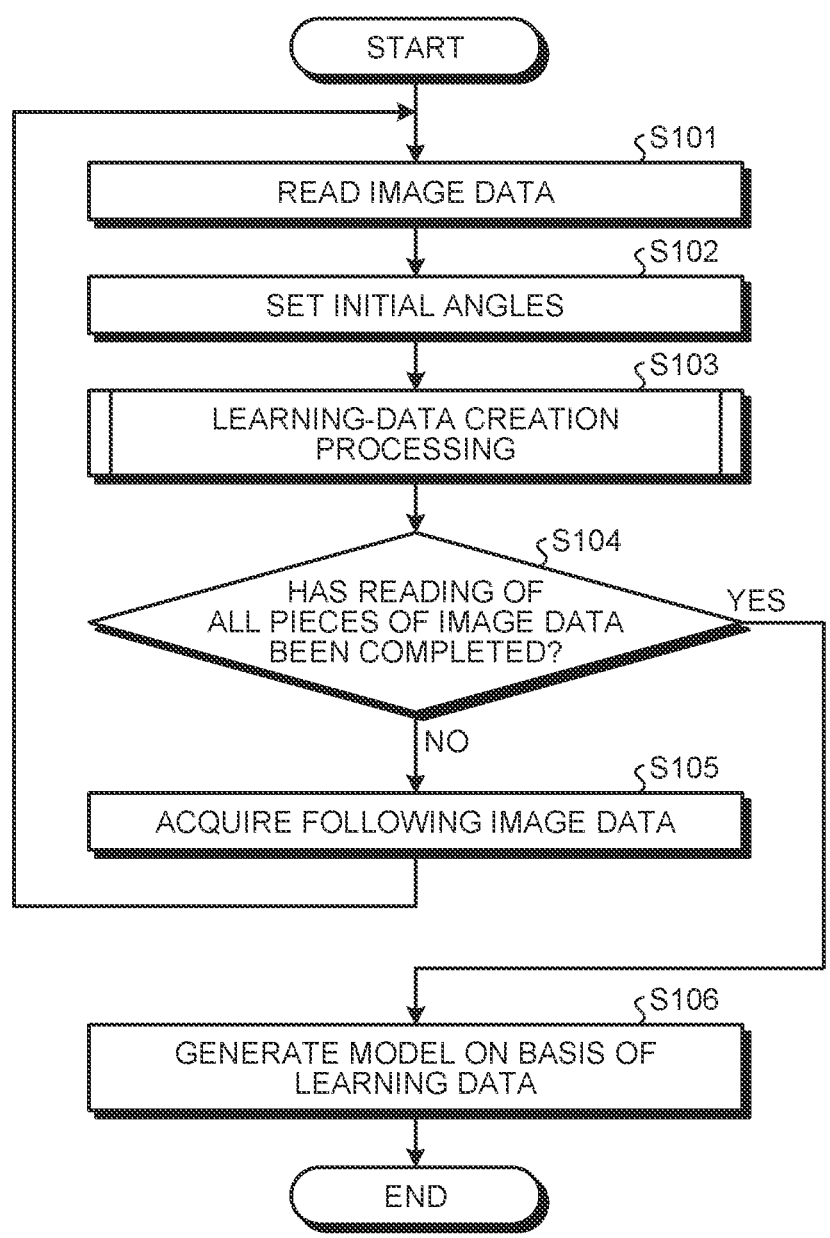
FIG. 11 is a flowchart (1) illustrating a processing procedure according to the first embodiment of the present disclosure.

Next, the procedure of the image processing according to the first embodiment will be described with reference to FIGS. 11 to 13. FIG. 11 is a flowchart (1) illustrating the processing procedure according to the first embodiment of the present disclosure.

As illustrated in FIG. 11, first, the image processing apparatus 100 refers to the image-data storage unit 121 and reads image data (step S101). Then, the image processing apparatus 100 sets initial angles to the image data (step S102). For example, the image processing apparatus 100 sets a roll angle of 0°, a yaw angle of 0°, and a pitch angle of 90° as the initial angles.

Subsequently, the image processing apparatus 100 executes learning-data creation processing (step S103). The detailed flow of the creation processing will be described below with reference to FIG. 12.

Subsequently, the image processing apparatus 100 determines whether or not reading of all the pieces of image data in the image-data storage unit 121 has been completed (step S104). In a case where the reading of all the pieces of image data has not been completed (step S104; No), the image processing apparatus 100 acquires the following learning data from the image-data storage unit 121 (step S105) and reads the image data thereof (step S101).

On the other hand, in a case where the reading of all the pieces of image data has been completed (step S104; Yes), the image processing apparatus 100 generates a model on the basis of the created learning data (step S106).

Next, the procedure of the learning-data creation processing will be described with reference to FIG. 12. FIG. 12 is a flowchart (2) illustrating the flow of processing according to the first embodiment of the present disclosure. The processing illustrated in FIG. 12 corresponds to that of step S103 illustrated in FIG. 11.

Figure 12:
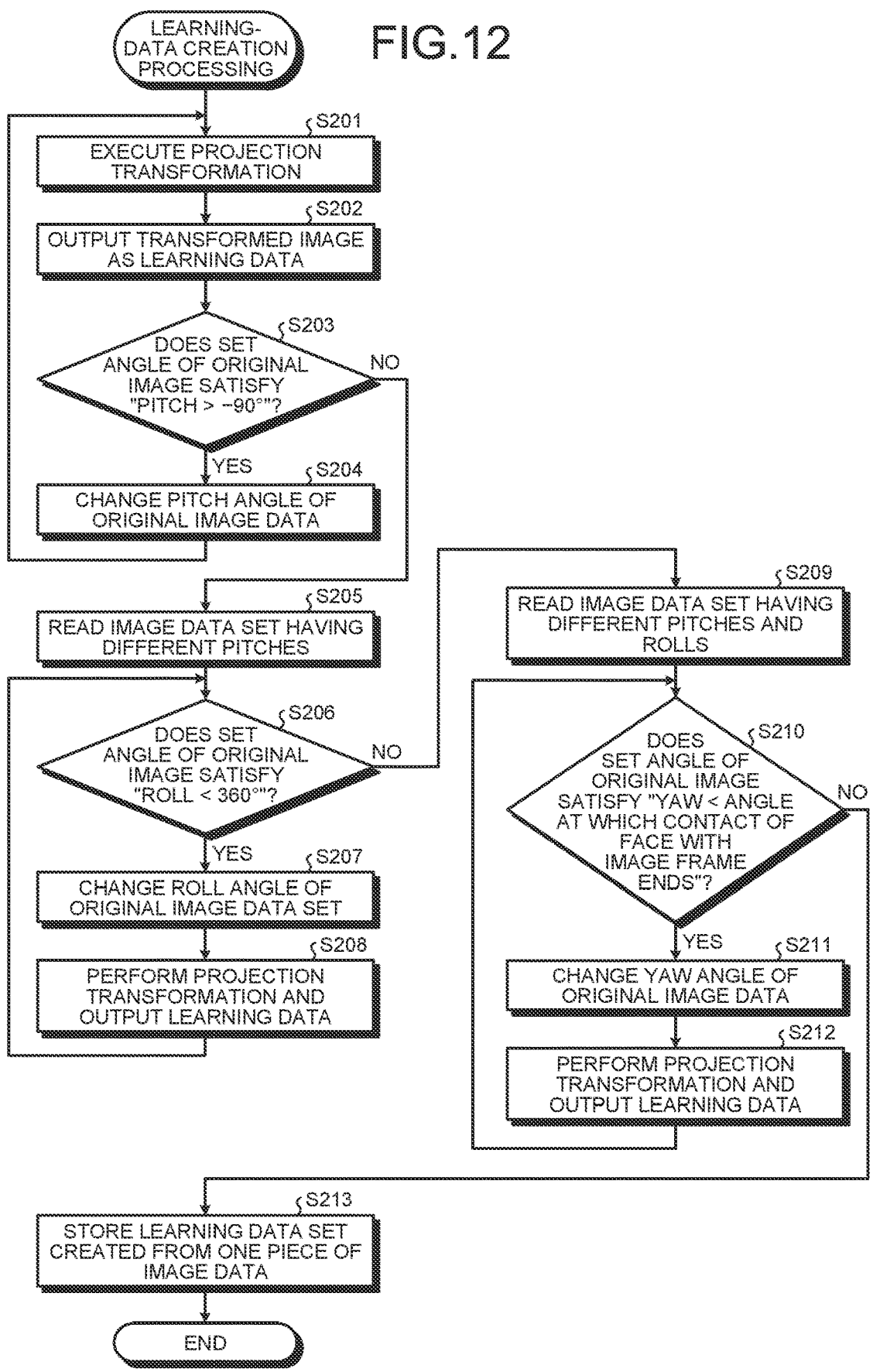
FIG. 12 is a flowchart (2) illustrating the processing procedure according to the first embodiment of the present disclosure.

As illustrated in FIG. 12, the image processing apparatus 100 executes projection transformation on the image data (step S201).

Then, the image processing apparatus 100 outputs the transformed image as learning data (step S202). As a result, the image processing apparatus 100 obtains one piece of learning data. For example, in a case where the image data having the initial angles is projection-transformed, the image processing apparatus 100 obtains learning data having a roll angle of 0°, a yaw angle of 0°, and a pitch angle of 90°.

Thereafter, the image processing apparatus 100 determines whether the set angle of the original image satisfies "pitch>−90°" (in other words, whether the set angle of the original image satisfies pitch≠−90°) (step S203). In a case where the set angle of the original image satisfies "pitch>−90°" (step S203; Yes), the image processing apparatus 100 changes the pitch angle of the original image data (step S204). For example, the image processing apparatus 100 decreases the pitch angle by 1° and sets the pitch angle to 89°. Then, the image processing apparatus 100 repeats the processing of re-reading the image data with the pitch angle changed (step S201).

On the other hand, in a case where the set angle of the original image does not satisfy "pitch>−90°" (step S203; No), the image processing apparatus 100 ends the change for the pitch of the original image data, sets pieces of image data different in pitch as one image data set, and reads the image data set (step S205).

Then, the image processing apparatus 100 determines whether the set angle of the original image satisfies "roll<360°" (in other words, whether the set angle of the original image satisfies roll≠360° (step S206). In a case where the set angle of the original image satisfies "roll<360°" (step S206; Yes), the image processing apparatus 100 changes each roll angle of the original image data set (step S207). For example, the image processing apparatus 100 increases the roll angle by 1° and sets the roll angle to 1°. Then, the image processing apparatus 100 performs projection transformation on the image data set with the roll angles changed and outputs learning data (step S208).

Thereafter, the image processing apparatus 100 repeats outputting learning data until each roll angle reaches 360°. Then, in a case where the set angle of the original image no longer satisfies "roll<360°" (step S206; Yes), the image processing apparatus 100 ends the change for the roll of the original image data, sets pieces of image data different in pitch and roll as one image data set, and reads the image data set (step S209).

Then, the image processing apparatus 100 determines whether the set angle of the original image satisfies "yaw<the angle at which the contact of the face with the image frame ends" (in other words, whether the yaw angle is within a range in which the face as the subject is divided laterally) (step S210).

In a case where the set angle of the original image satisfies "yaw<the angle at which the contact of the face with the image frame ends" (step S210; Yes), the image processing apparatus 100 changes each yaw angle of the original image data set (step S211). For example, the image processing apparatus 100 increases the roll angle by 1°. Then, the image processing apparatus 100 performs projection transformation on the image data set with the yaw angles changed, and outputs learning data (step S212).

Thereafter, the image processing apparatus 100 repeats outputting learning data until the yaw angle reaches "the angle at which the contact of the face with the image frame ends." Then, in a case where the set angle of the original image no longer satisfies "yaw<the angle at which the contact of the face with the image frame ends" (step S210; No), the image processing apparatus 100 ends the change for the yaw of the original image data, and stores the learning data set created from one piece of image data into the learning-data storage unit 122 (step S213).

Next, the procedure of the detection processing and the replacement processing will be described with reference to FIG. 13. FIG. 13 is a flowchart (3) illustrating the flow of processing according to the first embodiment of the present disclosure.

Figure 13:
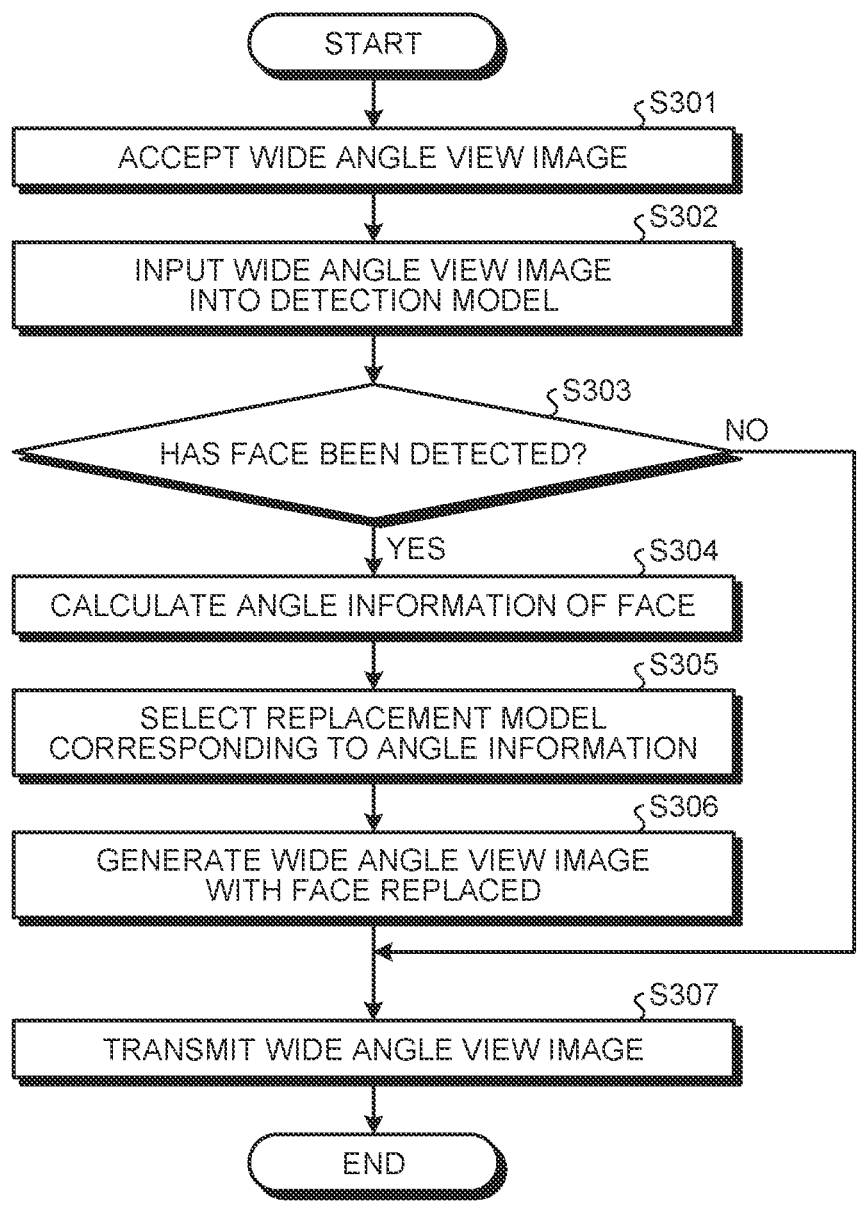
FIG. 13 is a flowchart (3) illustrating the processing procedure according to the first embodiment of the present disclosure.

As illustrated in FIG. 13, the image processing apparatus 100 accepts a wide angle view image to be a target of the detection processing (step S301). Then, the image processing apparatus 100 inputs the wide angle view image into a detection model 150 (step S302).

The image processing apparatus 100 determines whether or not a face has been detected from the wide angle view image (step S303). In a case where the face has been detected (step S303; Yes), the image processing apparatus 100 calculates angle information of the detected face (step S304).

Then, the image processing apparatus 100 selects the replacement model 160 corresponding to the angle information (step S305). Subsequently, the image processing apparatus 100 generates a wide angle view image with the face replaced (step S306).

After the face replacement, or in a case where no face has been detected (step S303; No), the image processing apparatus 100 transmits the wide angle view image to the HMD 10 or the like (step S307).

1-5. Modifications of First Embodiment

In the above first embodiment, there has been exemplified that the image processing apparatus 100 generating a detection model 150 from learning data 145. The image processing apparatus 100, however, may divide the learning data 145 on the basis of, for example, the attribute information of a subject, and may generate a detection model with a piece of the divided learning data. For example, the image processing apparatus 100 may classify learning data for each piece of attribute information such as race, gender, and age, and may generate a plurality of detection models using a learning data set after classification. As a result, the image processing apparatus 100 can perform learning focused on face images similar in feature amount, and thus the learning efficiency can be improved.

The image processing apparatus 100 may generate a detection model 150 for detection excluding a person's face. For example, the image processing apparatus 100 may generate a model for detecting a character, or a model for detecting a manufacturer's logo mark, registered trademark, or the like. In this case, the image processing apparatus 100 may hold image data of any object or the like for replacing the detected object, and may perform the replacement on basis of the held image data. As an example, in a case where a specific company name is captured in a signboard in an image, the image processing apparatus 100 may replaces the company name and may display text data such as "opening for advertisement" on the signboard.

Alternatively, the image processing apparatus 100 may delete a detected target instead of replacing the detected target. In this case, the image processing apparatus 100 may perform processing of filling a deleted portion with natural pixels, on the basis of the pixel information of the surroundings of the detected target before deletion.

2. Second Embodiment

Next, a second embodiment will be described. In the first embodiment, there has been exemplified that the image processing apparatus 100 creates learning data projection-transformed with the equirectangular projection scheme. In the second embodiment, there will be exemplified that an image processing apparatus 100 creates learning data projection-transformed with a scheme different from the equirectangular projection scheme. Note that the configuration of the image processing apparatus 100 is common to that of the first embodiment, and thus description will be omitted.

Figure 14:
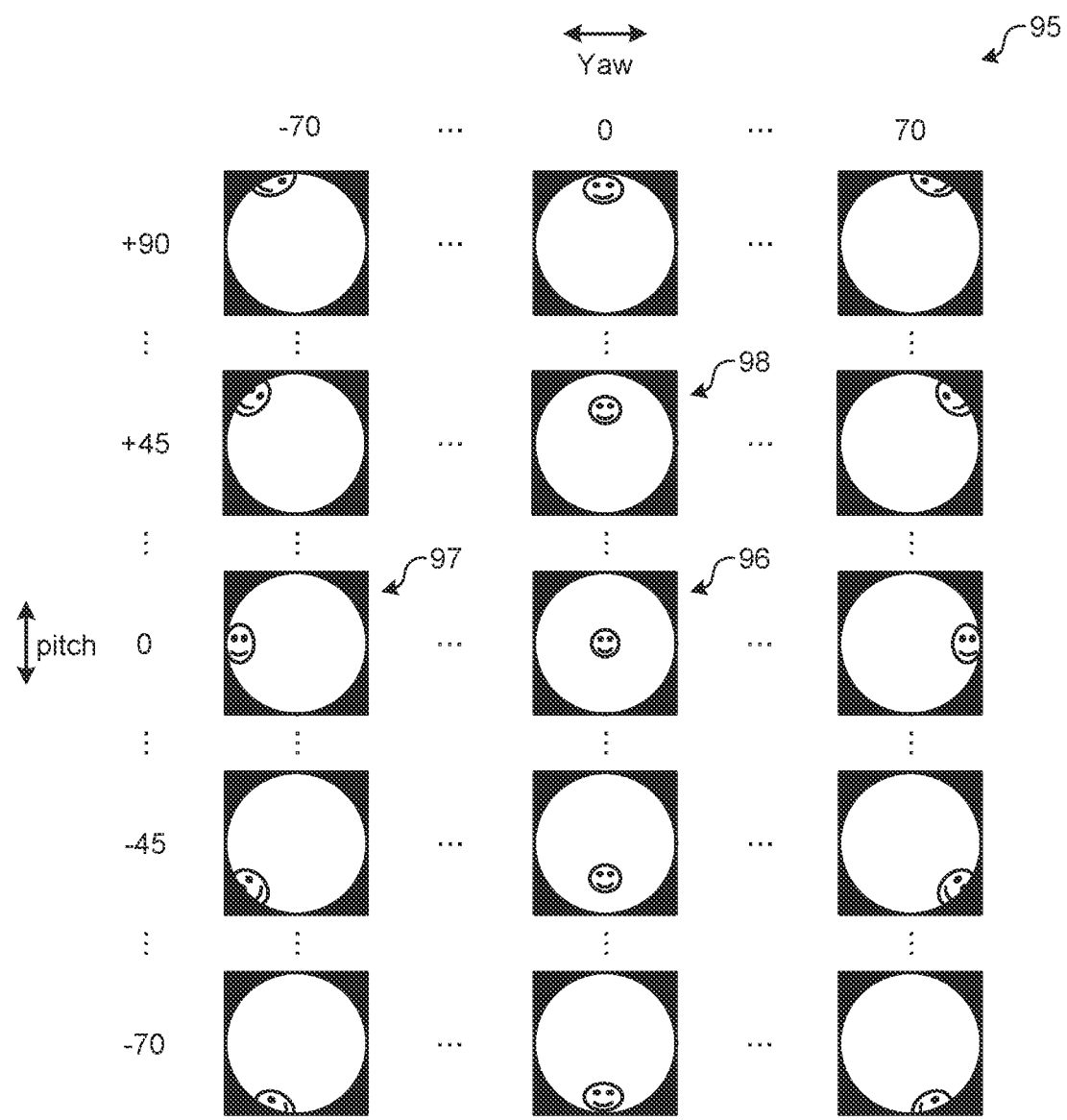
FIG. 14 illustrates the overview of image processing according to a second embodiment of the present disclosure.

FIG. 14 illustrates the overview of image processing according to the second embodiment of the present disclosure. FIG. 14 illustrates a learning data group 95 corresponding to images captured and generated by a so-called fisheye lens (hereinafter, referred to as "fisheye lens image"). Note that in the example illustrated in FIG. 14, as a range in which a face as a subject is captured in a fisheye lens image, the range of angles in pitch and yaw is indicated from −70° to 70°.

A fisheye lens image 96 represents an image having a pitch of 0° and a yaw of 0°. The image processing apparatus 100, for example, changes the angle in the yaw direction to an angle in the minus direction and creates learning data with the face is shifted left. For example, the image processing apparatus 100 changes the angle in the yaw direction to −70° while maintaining the pitch at 0°, and obtains a fisheye lens image 97. Furthermore, the image processing apparatus 100 changes the angle in the pitch direction to 45° while maintaining the yaw at 0°, and obtains a fisheye lens image 98.

In such a manner, similarly to the first embodiment, the image processing apparatus 100 changes the pitch direction and the yaw direction in sequence and performs projection transformation, so that the learning data group 95 corresponding to the fisheye lens can be created. Although not illustrated in FIG. 14, for each image data group 95 with the pitch direction and the yaw direction changed in sequence, the image processing apparatus 100 can further create a learning data group with the angles in the roll direction changed from 0° to 359°.

That is, the image processing apparatus 100 can create learning data in accordance with not only the equirectangular projection scheme described in the first embodiment but also various projection schemes. Furthermore, in addition to the example illustrated in FIG. 14, the image processing apparatus 100 may create learning data corresponding to various approaches to be used as a scheme for a wide angle view image such as a cube map image, an eccentric-spherical-surface mapping image, and the like. That is, as a predetermined projection transformation scheme for creating learning data, the image processing apparatus 100 performs projection transformation of at least any of equirectangular cylindrical projection, cube map, or fisheye projection and creates the learning data. In this case, as illustrated in the FIG. 14, the image processing apparatus 100 appropriately sets a range in which pitch and yaw angles are changed to a range suitable for each scheme, so that creation of extra learning data can be omitted and processing can be performed speedily.

3. Other Embodiments

The processing according to each of the above embodiments may be performed in various different forms in addition to each of the above embodiments.

For example, there has been exemplified that the image processing system 1 according to the present disclosure includes the image processing apparatus 100, the data server 200, and the HMD 10. However, the apparatuses included in the image processing system 1 may be combined or separated from each other. For example, the HMD 10 may include each processing unit that executes processing similar to that of the control unit 130 of the image processing apparatus 100 illustrated in FIG. 2, and the HMD 10 may perform standalone the information processing according to the present disclosure. In this case, the HMD 10 may be so-called VR goggles for a smartphone, which is achieved by inserting the smartphone or the like into a goggle-shaped casing.

Furthermore, in each of the above embodiments, the spherical content is represented as an example of the wide angle view image. The image processing according to the present disclosure, however, is applicable to images and content in addition to the spherical content. For example, the image processing according to the present disclosure is also applicable to so-called panoramic images and panoramic moving images each having an area wider than that displayable on the display of the HMD 10 at one time. It is also applicable to VR images and VR moving images (so-called semi-spherical content) each having a range of 180°. In addition, the wide angle view image is not limited to a still image and a moving image, and thus may be, for example, game content created by computer graphics (CG).

In addition, of the pieces of processing described in each of the above embodiments, the entirety or part of the processing that has been described as being automatically performed can be performed manually, or the entirety or part of the processing that has been described as being performed manually can be performed automatically with a known method. Furthermore, the processing procedures, specific names, information including various types of data and parameters illustrated in the above descriptions and drawings can be freely changed unless otherwise specified. For example, the various types of information illustrated in each drawing is not limited to the illustrated information.

Furthermore, each constituent element of the apparatuses illustrated in the drawings is functionally conceptual, and thus does not necessarily have to be physically configured as illustrated. That is, the specific form of separation or integration of each apparatus is not limited to that illustrated in the drawings, and thus the entirety or part of the apparatus may be functionally or physically separated or integrated on a unit basis in accordance with various loads or usage conditions. For example, the acquisition unit 131 and the acceptance unit 134 illustrated in FIG. 2 may be integrated.

Furthermore, each of the above embodiments and modifications can be appropriately combined within the range in which the processing contents is not inconsistent.

Furthermore, the effects described herein are merely examples and are not limited, and there may be additional effects.

4. Hardware Configuration

Figure 15:
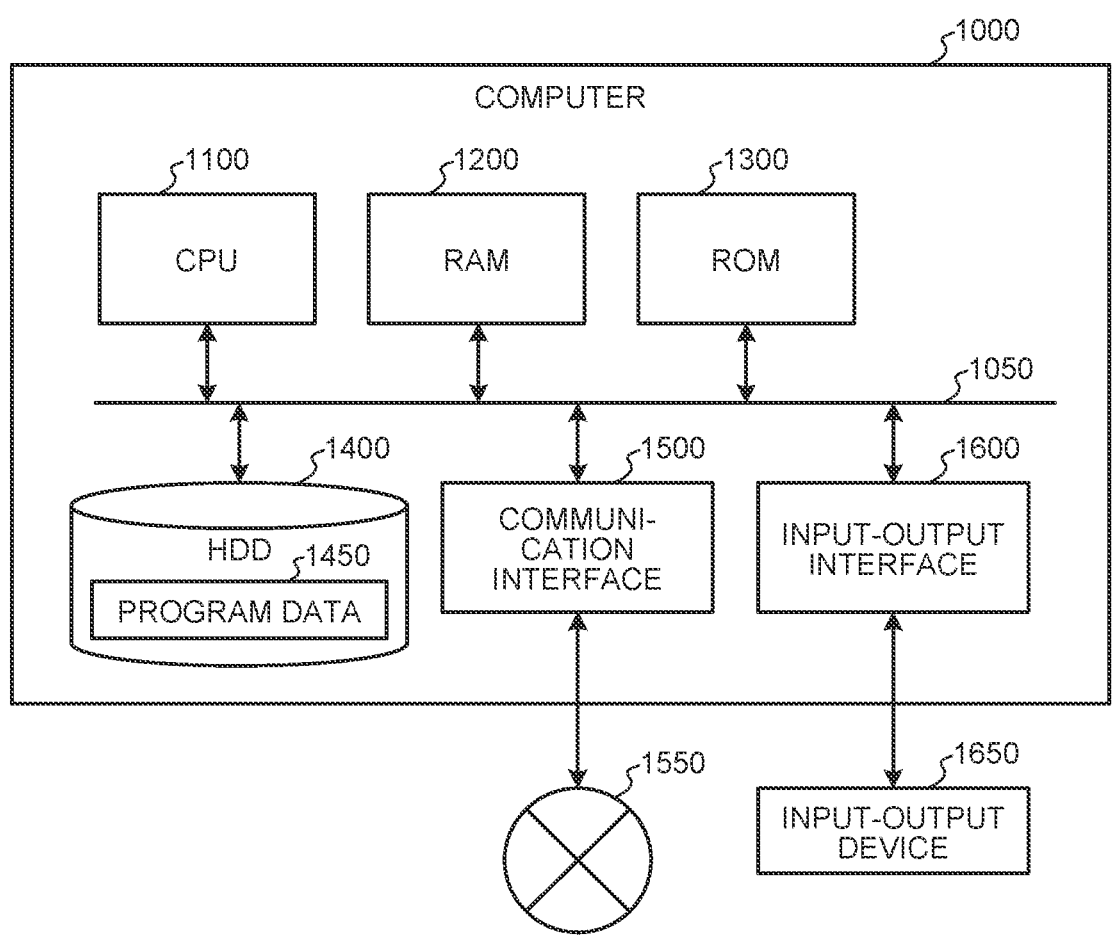
FIG. 15 is a hardware configuration diagram of an example of a computer that achieves the functions of an image processing apparatus.

Information equipment such as the image processing apparatus 100, the HMD 10, and the data server 200 according to each of the above embodiments is achieved by, for example, a computer 1000 having a configuration similar to that illustrated in FIG. 15. Hereinafter, the image processing apparatus 100 according to the first embodiment will be described as an example. FIG. 15 is a hardware configuration diagram of the example of the computer 1000 that achieves the functions of the image processing apparatus 100. The computer 1000 includes a CPU 1100, a RAM 1200, a read only memory (ROM) 1300, a hard disk drive (HDD) 1400, a communication interface 1500, and input-output interface 1600. Each constituent of the computer 1000 is connected by a bus 1050.

The CPU 1100 operates in accordance with a program stored in the ROM 1300 or the HDD 1400, and controls each constituent. For example, the CPU 1100 expands the program stored in the ROM 1300 or the HDD 1400 into the RAM 1200, and executes processing in accordance with the corresponding program.

The ROM 1300 stores a boot program such as a basic input output system (BIOS) executed by the CPU 1100 on startup of the computer 1000, a program dependent on the hardware of the computer 1000, and the like.

The HDD 1400 is a computer-readable recording medium that non-temporarily records a program executed by the CPU 1100, data used by the program, and the like. Specifically, the HDD 1400 is a recording medium that records the image processing program according to the present disclosure, which is an example of program data 1450.

The communication interface 1500 is an interface for connecting the computer 1000 to an external network 1550 (e.g., the Internet). For example, the CPU 1100 receives data from other equipment or transmits data generated by the CPU 1100 to the other equipment via the communication interface 1500.

The input-output interface 1600 is an interface for connecting an input-output device 1650 and the computer 1000. For example, the CPU 1100 receives data from an input device such as a keyboard or a mouse via the input-output interface 1600. The CPU 1100 also transmits data to an output device such as a display, a speaker, or a printer via the input-output interface 1600. Furthermore, the input-output interface 1600 may function as a media interface that reads a program or the like recorded on a predetermined recording medium. The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the image processing apparatus 100 according to the first embodiment, the CPU 1100 of the computer 1000 executes the image processing program loaded on the RAM 1200 to realize the function of the control unit 130. In addition, the HDD 1400 stores the image processing program according to the present disclosure and data in the storage unit 120. Note that the CPU 1100 reads the program data 1450 from the HDD 1400 and executes the program data 1450; however, as another example, these programs may be acquired from another apparatus via the external network 1550.

Note that the present technology can also have configurations as below.

(1)

An image processing apparatus comprising:
a learning-data creation unit configured to perform projection transformation on image data including a target as a subject, the learning-data creation unit being configured to create learning data including the target as correct data; and
a model generation unit configured to generate, based on the learning data created by the learning-data creation unit, a learned model for detecting the target included in input data that includes a wide angle view image and is input to the learned model, the wide angle view image being created by projection transformation identical in scheme to the projection transformation by which the learning data is created.

(2) The image processing apparatus according to (1),
wherein the learning-data creation unit
changes an angle of the subject from an initial state of the subject,
performs projection transformation on image data corresponding to the changed angle, and
creates the learning data.

(3) The image processing apparatus according to (2),
wherein the learning-data creation unit
changes respective angles in a pitch direction, a roll direction, and a yaw direction of the subject,
performs projection transformation on image data corresponding to the changed angles, and
creates the learning data.

(4) The image processing apparatus according to (3),
wherein the learning-data creation unit
changes the angle in the yaw direction of the subject within a range in which the subject is partially in contact with an image frame of the image data,
performs projection transformation on image data corresponding to the changed angle, and
creates the learning data.

(5) The image processing apparatus according to any one of (1) to (4), further comprising:
a detection unit configured to detect the target from the input data with the learned model generated by the model generation unit.

(6) The image processing apparatus according to (5),
wherein the model generation unit
generates a plurality of learned models on a type basis of the projection transformation, the plurality of learned models being different from each other, and
the detection unit
selects a learned model corresponding to the type of the projection transformation performed on the input data, from among the plurality of learned models, and
detects the target with the selected learned model.

(7) The image processing apparatus according to (5) or (6),
wherein the model generation unit
generates, based on the learning data created by the learning-data creation unit, a replacement model for replacing entirely or partially the target detected by the detection unit.

(8) The image processing apparatus according to (7),
wherein the learning-data creation unit
changes an angle of the subject from an initial state of the subject,
performs projection transformation on image data corresponding to the changed angle, and
creates the learning data, and
the model generation unit
generates, based on learning data created on an angle basis by the learning-data creation unit, a plurality of replacement models on an angle basis, the plurality of replacement models being different from each other.

(9) The image processing apparatus according to (8),
wherein the detection unit
selects a replacement model corresponding to the target detected from the input data, from among the plurality of replacement models generated by the model generation unit, and replaces the target, with the selected replacement model.

(10) The image processing apparatus according to (9),
wherein the detection unit
replaces a portion included in the target that is detected from the input data.

(11) The image processing apparatus according to any one of (1) to (10),
wherein the model generation unit
generates a learned model for detecting the target included in at least any of spherical content, semispherical content, or a panoramic image, as the wide angle view image.

(12) The image processing apparatus according to any one of (1) to (11),
wherein the learning-data creation unit
creates the learning data from image data including a subject of a human face as the target.

(13) The image processing apparatus according to (12),
wherein the learning-data creation unit
creates the learning data from the image data in which position information of each part included in the human face is set.

(14) The image processing apparatus according to any one of (1) to (13),
wherein the learning-data creation unit
performs at least any of equirectangular projection, cube map, or fisheye projection, as the scheme of the projection transformation, and
generates the learning data.

(15) An image processing method, by a computer, comprising:
performing projection transformation on image data including a target as a subject and creating learning data including the target as correct data; and
generating, based on the created learning data, a learned model for detecting the target included in input data that includes a wide angle view image and is input to the learned model, the wide angle view image being created by projection transformation identical in scheme to the projection transformation by which the learning data is created.

(16) An image processing program for causing a computer to function as:
a learning-data creation unit configured to perform projection transformation on image data including a target as a subject, the learning-data creation unit being configured to create learning data including the target as correct data; and
a model generation unit configured to generate, based on the learning data created by the learning-data creation unit, a learned model for detecting the target included in input data that includes a wide angle view image and is input to the learned model, the wide angle view image being created by projection transformation iden-

REFERENCE SIGNS LIST

1 IMAGE PROCESSING SYSTEM
10 HMD
100 IMAGE PROCESSING APPARATUS
110 COMMUNICATIONS UNIT
120 STORAGE UNIT
121 IMAGE-DATA STORAGE UNIT
122 LEARNING-DATA STORAGE UNIT
123 MODEL STORAGE UNIT
130 CONTROL UNIT
131 ACQUISITION UNIT
132 LEARNING-DATA CREATION UNIT
133 MODEL GENERATION UNIT
134 ACCEPTANCE UNIT
135 DETECTION UNIT
136 TRANSMISSION UNIT
150 DETECTION MODEL
160 REPLACEMENT MODEL
200 DATA SERVER

The invention claimed is:

1. An image processing apparatus, comprising:
a learning-data creation unit configured to:
  perform projection transformation on image data including a target as a subject, and
  create learning data including the target as correct data; and
a model generation unit configured to:
  generate, based on the learning data created by the learning-data creation unit, a learned model for detection of the target included in input data that includes a wide angle view image and is input to the learned model, the wide angle view image being created by projection transformation identical in scheme to the projection transformation by which the learning data is created,
  wherein the learning-data creation unit is further configured to:
    change an angle of the subject in the image data, from an initial state of the subject,
    perform the projection transformation on the image data corresponding to the changed angle, and
    create the learning data.

2. The image processing apparatus according to claim 1, wherein the learning-data creation unit is configured to:
change respective angles in a pitch direction, a roll direction, and a yaw direction of the subject,
perform the projection transformation on the image data corresponding to the changed angles, and
create the learning data based on the performed projection transformation.

3. The image processing apparatus according to claim 2, wherein the learning-data creation unit is configured to:
change the angle in the yaw direction of the subject within a range in which the subject is partially in contact with an image frame of the image data,
perform the projection transformation on the image data corresponding to the changed angle, and
create the learning data.

4. The image processing apparatus according to claim 3, wherein the learning-data creation unit is further configured to perform at least one of equirectangular projection, cube map, or fisheye projection, as the scheme of the projection transformation, and creates the learning data.

5. The image processing apparatus according to claim 1, further comprising: a detection unit configured to detect the target from the input data with the learned model generated by the model generation unit.

6. The image processing apparatus according to claim 5, wherein
the model generation unit is further configured to generate a plurality of the learned models based on a type of the projection transformation, the plurality of learned models being different from each other, and
the detection unit is configured to:
  select a learned model that corresponds to the type of the projection transformation performed on the input data, from among the plurality of learned models, and
  detect the target with the selected learned model.

7. The image processing apparatus according to claim 5, wherein the model generation unit is further configured to generate, based on the learning data created by the learning-data creation unit, a replacement model to replace entirely or partially the target detected by the detection unit.

8. The image processing apparatus according to claim 7, wherein
the learning-data creation unit is configured to:
  change a first angle of a plurality of angles of the subject from the initial state of the subject,
  perform the projection transformation on the image data corresponding to the changed angle, and
  create the learning data for each of the plurality of angles based on the projection transformation performed for the respective angles of the plurality of angles, and
the model generation unit is configured to:
  generate, based on learning data created each of the plurality of angles angle basis by the learning-data creation unit, a plurality of replacement models for the respective angles of the plurality of angles, the plurality of replacement models being different from each other.

9. The image processing apparatus according to claim 8, wherein the detection unit is configured to:
select a replacement model that corresponds to the target detected from the input data, from among the plurality of replacement models generated by the model generation unit, and
replace the target, with the selected replacement model.

10. The image processing apparatus according to claim 9, wherein the detection unit is further configured to replace a portion included in the target that is detected from the input data.

11. The image processing apparatus according to claim 10, wherein the model generation unit is further configured to generate a learned model for the detection of the target included in at least one of spherical content, semi-spherical content, or a panoramic image, as the wide angle view image, and
the detection unit is further configured to detect the target from the input data with the learned model for the detection of the target included in the at least one of the spherical content, the semi-spherical content, or the panoramic image.

12. The image processing apparatus according to claim 1, wherein the model generation unit is further configured to generate the a learned model for the detection of the target included in at least one of spherical content, semi-spherical content, or a panoramic image, as the wide angle view image.

13. The image processing apparatus according to claim 1, wherein the learning-data creation unit is further configured to create the learning data from the image data that includes a human face as the target.

14. The image processing apparatus according to claim 13, wherein the learning-data creation unit is further configured to create the learning data from the image data in which position information of each part included in the human face is set.

15. The image processing apparatus according to claim 1, wherein the learning-data creation unit is further configured to perform at least one of equirectangular projection, cube map, or fisheye projection, as the scheme of the projection transformation, and generate the learning data.

16. The image processing apparatus according to claim 15, wherein the learning-data creation unit is further configured to create the learning data from the image data that includes a human face as the target.

17. An image processing method, comprising:
performing projection transformation on image data including a target as a subject and creating learning data including the target as correct data; and
generating, based on the created learning data, a learned model for detecting the target included in input data that includes a wide angle view image and is input to the learned model, the wide angle view image being created by projection transformation identical in scheme to the projection transformation by which the learning data is created,
wherein the performing projection transformation and the creating learning data includes
changing an angle of the subject from an initial state of the subject,
performing the projection transformation on the image data corresponding to the changed angle, and
creating the learning data.

18. A non-transitory computer-readable medium having stored thereon, computer-executable instructions which, when executed by a computer, cause the computer to execute operations, the operations comprising:
performing projection transformation on image data including a target as a subject, and creating learning data including the target as correct data; and
generating, based on the created learning data, a learned model for detecting the target included in input data that includes a wide angle view image and is input to the learned model, the wide angle view image being created by projection transformation identical in scheme to the projection transformation by which the learning data is created,
wherein performing the projection transformation and creating the learning data includes:
changing an angle of the subject from an initial state of the subject,
performing the projection transformation on the image data corresponding to the changed angle, and
creating the learning data.

19. An image processing apparatus, comprising:
a learning-data creation unit configured to:
perform projection transformation on image data including a target as a subject, and
create learning data including the target as correct data; and
a model generation unit configured to:
generate, based on the learning data created by the learning-data creation unit, a learned model for detection of the target included in input data that includes a wide angle view image and is input to the learned model, the wide angle view image being created by projection transformation identical in scheme to the projection transformation by which the learning data is created,
wherein the learning-data creation unit is further configured to:
change respective angles in a pitch direction, a roll direction, and a yaw direction of the subject,
perform the projection transformation on the image data corresponding to each of the changed angles, and
create the learning data based on the performed projection transformation.

20. An image processing apparatus, comprising:
a learning-data creation unit configured to:
perform projection transformation on image data including a target as a subject, and
create learning data including the target as correct data; and
a model generation unit configured to:
generate, based on the learning data created by the learning-data creation unit, a learned model for detection of the target included in input data that includes a wide angle view image and is input to the learned model, the wide angle view image being created by projection transformation identical in scheme to the projection transformation by which the learning data is created, wherein
the model generation unit is further configured to generate the learned model for the detection of the target included in at least one of spherical content, semi-spherical content, or a panoramic image, as the wide angle view image, and
the learning-data creation unit is further configured to:
change an angle of the subject in the image data, from an initial state of the subject,
perform the projection transformation on the image data corresponding to the changed angle, and
create the learning data.

* * * * *